(12) United States Patent
Yermalayeu et al.

(10) Patent No.: US 8,132,030 B2
(45) Date of Patent: Mar. 6, 2012

(54) DEVICE AND A METHOD FOR MANAGING POWER CONSUMPTION OF A PLURALITY OF DATA PROCESSING UNITS

(75) Inventors: Siarhei Yermalayeu, Eindhoven (NL); Ozcan Mesut, Eindhoven (NL); Steven Broeils Luitjens, Eindhoven (NL); Jozef Pieter Van Gassel, Eindhoven (NL); Artur Tadeusz Burchard, Eindhoven (NL); Gilein De Nijs, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 541 days.

(21) Appl. No.: 12/305,208

(22) PCT Filed: Jun. 26, 2007

(86) PCT No.: PCT/IB2007/052463
§ 371 (c)(1),
(2), (4) Date: Dec. 17, 2008

(87) PCT Pub. No.: WO2008/007273
PCT Pub. Date: Jan. 17, 2008

(65) Prior Publication Data
US 2009/0282275 A1   Nov. 12, 2009

(30) Foreign Application Priority Data
Jun. 27, 2006   (EP) .................................. 06116156

(51) Int. Cl.
*G06F 1/32* (2006.01)

(52) U.S. Cl. .................. 713/320; 713/300; 713/310

(58) Field of Classification Search ............... 713/300, 713/310, 320
See application file for complete search history.

(56) References Cited

U.S. PATENT DOCUMENTS

| | | | |
|---|---|---|---|
| 5,951,689 A * | 9/1999 | Evoy et al. | ..................... 713/322 |
| 5,991,884 A | 11/1999 | Lin et al. | |
| 6,167,524 A | 12/2000 | Goodnow et al. | |
| 6,401,212 B1 | 6/2002 | Rondi et al. | |

(Continued)

FOREIGN PATENT DOCUMENTS

EP   1096360 A1   5/2001

(Continued)

OTHER PUBLICATIONS

T.L. Martin, "Balancing Batteries, Power, and Performance: System Issues in CPU speed-Setting for Mobile Computing", Carnegie Mellon University, Pittsburgh, PA, Aug. 1999.

*Primary Examiner* — Kim Huynh
*Assistant Examiner* — Zahid Choudhury

(57) ABSTRACT

A device and a method for managing power consumption of a plurality of data processing units. A scheduler (280) schedules a first process step for a first data processing unit (200) consuming a high power within a first deadline and a second process step for a second data processing unit (240) also consuming a high power within a second deadline. The scheduler further schedules the first process step and the second process step such that the two process steps do not occur concurrently thereby reducing the peak power draw from a power supply while preserving deadlines. This is particularly beneficial in battery-operated equipment, such as portable electronic multimedia devices, since peak power drain has been found to be an important factor in determining the battery capacity.

20 Claims, 18 Drawing Sheets

U.S. PATENT DOCUMENTS

| | | | |
|---|---|---|---|
| 6,763,439 B1 | 7/2004 | Bakin et al. | |
| 7,779,280 B2 * | 8/2010 | Shuster | 713/320 |
| 7,873,776 B2 * | 1/2011 | Hetherington et al. | 711/5 |
| 2003/0088800 A1 * | 5/2003 | Cai | 713/320 |
| 2004/0236969 A1 | 11/2004 | Lippert et al. | |
| 2007/0083785 A1 * | 4/2007 | Sutardja | 713/323 |
| 2008/0077815 A1 * | 3/2008 | Kanakogi | 713/322 |
| 2009/0199025 A1 * | 8/2009 | Sherman et al. | 713/310 |

FOREIGN PATENT DOCUMENTS

| | | |
|---|---|---|
| JP | 2004227555 A | 8/2004 |
| WO | 0026747 A1 | 5/2000 |
| WO | 0217052 A2 | 2/2002 |
| WO | 2004017320 A1 | 2/2004 |
| WO | 2005020062 A1 | 3/2005 |

* cited by examiner

DEVICE AND A METHOD FOR MANAGING POWER CONSUMPTION OF A PLURALITY OF DATA PROCESSING UNITS

FIELD OF THE INVENTION

The invention relates to a device for managing power consumption of a plurality of data processing units.

The invention further relates to a method for managing power consumption of a plurality of data processing units.

The invention further relates to a program element.

The invention further relates to a computer-readable medium.

BACKGROUND OF THE INVENTION

All electronics devices consume power. The power consumed translates directly into cost for an end user. For example, the power consumed by a home video cassette recorder results in an energy bill. For mobile devices the power consumed also translates into a certain time for which a device will operate. For example, when a portable audio player runs on batteries. In general saving power is always of benefit to an end user. This can be achieved by operating devices as efficiently as possible. This is true for both situations in the home and on the move.

In U.S. Pat. No. 6,167,524 an apparatus and method is disclosed for controlling power consumption in portable personal computers by dynamically allocating power to the system logic. Expected total power consumption is calculated and compared to an optimum power efficiency value. The expected power consumption values for each execution unit are stored in a look-up table in actual or compressed form. If the expected total power consumption value exceeds the power efficiency value, selected execution units are made inactive. This may also include cancelling operations, most notably speculative operations. Conversely, if the power efficiency value exceeds the expected total power consumption value, execution units functions are added in order to maintain a level current demand on the battery.

Electronic devices operating in the Consumer Electronics domain generally have requirements of providing a guaranteed quality of service to an end user. For example, an audio playback device should always play the audio desired by an end user and a video playback device should always play the video desired by an end user and this should be performed without noticeable glitches in the audio or video playback. Furthermore, in such Consumer Electronics devices there are generally multiple units for processing the data beyond the execution units that consume significant amounts of power. For example, storage units, such as hard disk drives or optical drives, or communications units, such as a network controller or WiFi interface, consume significant power. Therefore, a solution that is not specific for execution units would be preferable. Additionally, the use of speculative operations is uncommon in Consumer Electronics devices therefore the cancelling of speculative operations is less applicable. Even without the use of speculative operations the cancelling of operations in general is not possible in Consumer Electronics devices, since this will likely impact upon the quality of service delivered.

The inventors recognising this problem devised the present invention.

BRIEF SUMMARY OF THE INVENTION

The present invention seeks to improve the management of power consumption in devices.

Accordingly, there is provided, in a first aspect of the present invention, a device for managing power consumption of a plurality of data processing units, the device comprising a first data processing unit having a first power mode of operation whilst processing a first process step and a second power mode of operation whilst processing another process step, the first power mode having a higher power consumption than the second power mode, a second data processing unit having a third power mode of operation whilst processing a second process step and a fourth power mode of operation whilst processing a further another process step, the third power mode having a higher power consumption than the fourth power mode and a scheduler for scheduling the first process step within a first deadline and for scheduling the second process step within a second deadline, wherein the scheduler further schedules the first process step and the second process step non-concurrently.

According to a second aspect of the invention a method for managing power consumption of a plurality of data processing units is provided, the method comprising identifying a first process step requiring a first power mode of operation of a first data processing unit, the first power mode being a power mode of higher power consumption than a second power mode of operation of the first data processing unit, identifying a second process step requiring a third power mode of operation of a second data processing unit, the third power mode being a power mode of higher power consumption than a fourth power mode of operation of the second data processing unit, scheduling the first process step within a first deadline and scheduling the second process step within a second deadline, wherein the method step of scheduling further schedules the first process step and the second process step non-concurrently.

According to a third aspect of the invention a program element directly loadable into the memory of a programmable device is provided, comprising software code portions for performing, when said program element is run on the device, the method of identifying a first process step requiring a first power mode of operation of a first data processing unit, the first power mode being a power mode of higher power consumption than a second power mode of operation of the first data processing unit, identifying a second process step requiring a third power mode of operation of a second data processing unit, the third power mode being a power mode of higher power consumption than a fourth power mode of operation of the second data processing unit, scheduling the first process step within a first deadline and scheduling the second process step within a second deadline, wherein the method step of scheduling further schedules the first process step and the second process step non-concurrently.

According to a fourth aspect of the invention a computer-readable medium directly loadable into the memory of a programmable device is provided, comprising software code portions for performing, when said code portions are run on the device, the method of identifying a first process step requiring a first power mode of operation of a first data processing unit, the first power mode being a power mode of higher power consumption than a second power mode of operation of the first data processing unit, identifying a second process step requiring a third power mode of operation of a second data processing unit, the third power mode being a power mode of higher power consumption than a fourth power mode of operation of the second data processing unit, scheduling the first process step within a first deadline and scheduling the second process step within a second deadline, wherein the method step of scheduling further schedules the first process step and the second process step non-concurrently.

When there exists a plurality of data processing units with each of the plurality of data processing units capable of drawing a relatively high power from a power source it is advantageous to provide a device and a method for managing the power consumption of the plurality of data processing units. Providing a scheduler that schedules a first process step for a first data processing unit consuming a high power within a first deadline and a second process step for a second data processing unit also consuming a high power within a second deadline allows the two process steps and related deadlines to be co-ordinated and by further scheduling the first process step and the second process step such that the two process steps do not occur concurrently the peak power drawn from the power supply may be limited whilst preserving deadlines. This is particularly beneficial in battery-operated equipment, such as portable electronic multimedia devices, since peak power drain has been found to be an important factor in determining the battery capacity.

In one embodiment a scheduler is provided which may further comprises a first power management unit for setting a desired mode of operation of the first data processing unit and a second power management unit for setting a desired mode of operation of the second data processing unit. This allows the scheduler to provide active control over both the first data processing unit and the second data processing unit.

In a further embodiment a first power management unit may be communicatively coupled to a second power management unit to communicate a desired mode of operation of a first data processing unit to a second power management unit. This allows the second power management unit to react to changes in the mode of operation of the first data processing unit and control the second data processing unit accordingly.

In another embodiment a clock generation unit may be provided and a second data processing unit may be a processor driven by a clock generated by the clock generation unit. Further, a second power management unit may be communicatively coupled to the clock generation unit to control the clock generation unit based upon a desired mode of operation of the second data processing unit. This allows the power consumed by the second data processing unit to be controlled.

In yet another embodiment a clock generated by a clock generation unit may be a high frequency such that the second data processing unit operates in a third power mode of operation or a low frequency such that the second data processing unit operates in the fourth power mode of operation. This allows the power consumed by the second data processing unit to be controlled in a fine-grained manner, whilst maintaining any real-time deadlines.

In one embodiment a power management unit may be provided, and a second data processing unit may be a processor driven by a clock and a voltage generated by the power management unit and a second power management unit may be communicatively coupled to the power management unit to control the power management unit based upon a desired mode of operation of the second data processing unit.

In another embodiment a clock generated by a power management unit may be a high frequency such that a second data processing unit operates in a third power mode of operation or a low frequency such that the second data processing unit operates in a fourth power mode of operation.

In a further embodiment a voltage generated by a power management unit may be a high voltage such that a second data processing unit operates in a third power mode of operation or a low voltage such that the second data processing unit operates in a fourth power mode of operation.

In an embodiment a first data processing unit may be communicatively coupled to a second data processing unit for passing an output of a first process step as an input to a second process step. A sequential construction of the data processing units is a useful embodiment of practical significance.

In another embodiment a buffer may be provided, the buffer may be communicatively coupled to a first data processing unit and a second data processing unit and the first data processing unit may store an output of a first process step in the buffer and the second data processing unit may read the output of the first process step from the buffer. This allows further flexibility in the scheduling of operations over a longer time period whilst reducing the peak power.

In another embodiment a first data processing unit or a second data processing unit may be one of a selection from a processor, a storage unit, a compression unit, a decompression unit, a combined compression and decompression unit or a communication unit. These are useful data processing units in Consumer Electronics devices.

In a further embodiment a programmable timer may be provided, the timer may be communicatively coupled to a second data processing unit for programming a time period of the timer and for awakening the second data processing unit upon expiration of the time period. This allows the second data processing unit to be transitioned to a very low power mode, thereby saving power.

In an embodiment a second power mode of operation may be a standby mode or a power off mode. This allows power to be saved since such modes consume less power than active operating modes.

In a further embodiment an application management unit may be provided for managing resources for at least one application based upon characteristics of the at least one application, the application management unit may be communicatively coupled to the scheduler. This allows resources of all applications to be administered in an optimised manner.

In a further embodiment an apparatus according to the invention may be realized as at least one of the group consisting of a Set-Top-Box device, a digital video recording device, a network-enabled device, a conditional access system, a portable audio player, a portable video player, a mobile phone, a DVD player, a CD player, a hard disk based media player, an Internet radio device, a computer, a television, a public entertainment device and an MP3 player, the apparatus comprising a device for managing power consumption of a plurality of data processing units and a power supply for supplying power to the data processing units. However, these applications are only exemplary.

In another embodiment a desired mode of operation of a first data processing unit may be set and a desired mode of operation of a second data processing unit may also be set. This allows active control of both the first data processing unit and the second data processing unit.

The data processing required according to the invention can be realized by a computer program, that is to say by software, or by using one or more special electronic optimization circuits, that is to say in hardware, or in hybrid form, that is to say by means of software components and hardware components.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

Figure 1:
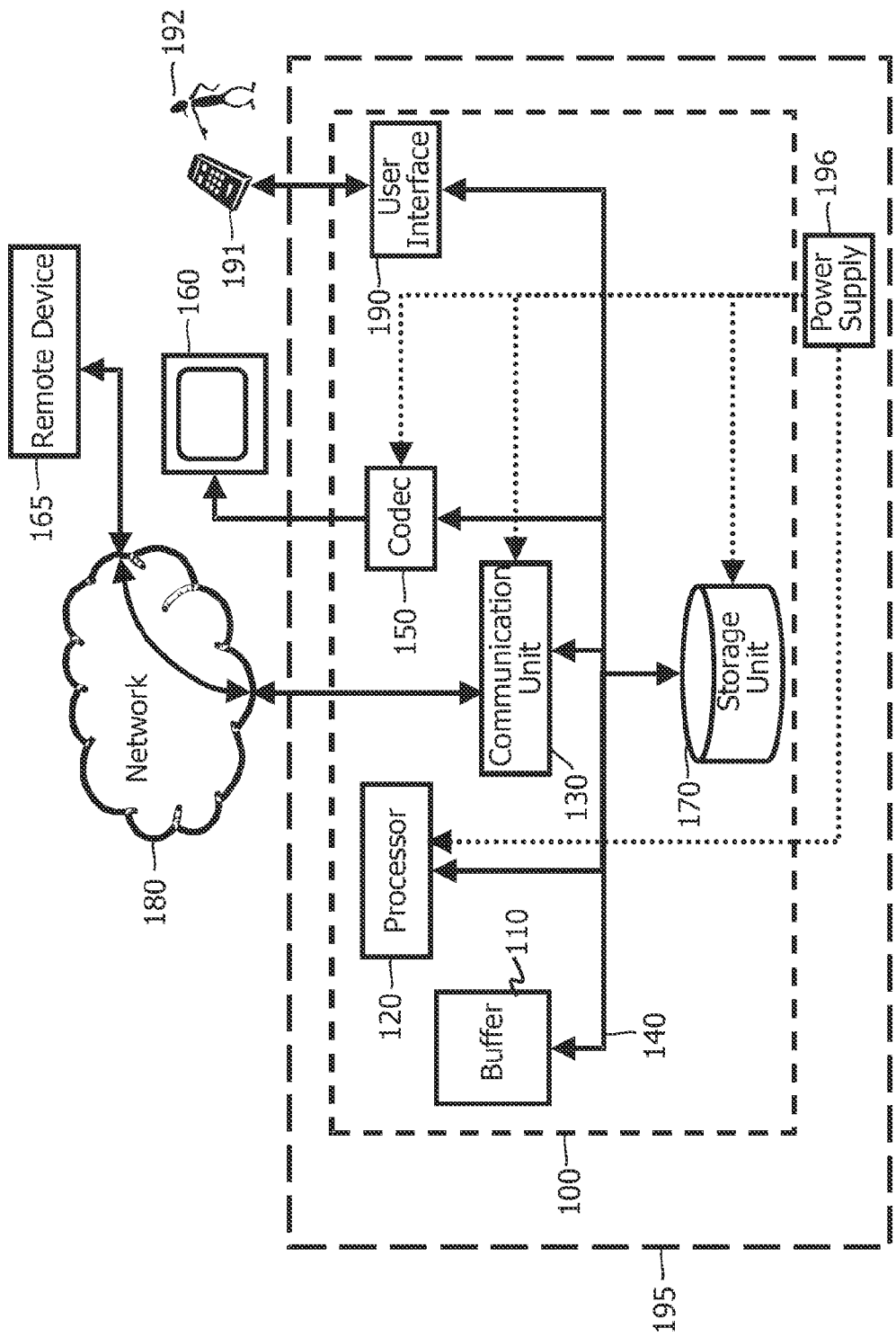
FIG. 1 illustrates a device wherein an embodiment of the invention may be applied.

The Figures are schematically drawn and not true to scale, and the identical reference numerals in different Figures refer to corresponding elements. It will be clear for those skilled in the art, that alternative but equivalent embodiments of the invention are possible without deviating from the true inventive concept, and that the scope of the invention will be limited by the claims only.

DETAILED DESCRIPTION OF THE INVENTION

In the following the term processing unit, or data processing unit, is prevalently used. The term processing unit may include a single processing step practised on a data stream, or it may comprise multiple individual processing steps taken as one. Examples of processing units are audio/video encoders or decoders, data stream filters, audio processing for equalization, video processing for colours etc. The term processing unit may also include the process of storing a data stream. For example, in non-volatile memory, such as a hard disk drive, optical disc drive or on a flash memory device. The term processing unit may also include the process of transmitting or receiving a data stream via a network interface controller in wired or wireless configurations. In the scope of the present invention a processing unit should be understood as a unit having an input, or output, for a data stream, and that the data stream is processed in a streaming manner. For inherently non-streaming units which multiplex multiple data streams, such as hard disk drives and wireless interface cards, this may be achieved with the assistance of a streaming buffer.

FIG. 1 shows a device 100 according to an embodiment of the invention. The device 100 comprises a storage unit 170, which may be a hard disk drive, a floppy disc drive, a flash memory device, an optical drive or equivalent. The storage unit 170 may be used to store audio and video that a user 192 would like to preserve or render. The device 100 may, for example, be a portable audio/video jukebox device running from power supply 196, such as a battery or power adaptor (both not shown). The device 100 may also comprise a codec 150 for encoding and/or decoding audio/video data streams for display on a local display 160. Alternatively, a processor 120 may be used to encode or decode the audio/video data streams. An audio rendering device (not shown), such as a speaker, may also be present in the device 100 or externally connected to the device 100. The device 100 may also comprise a communication unit 130, such as an Ethernet interface, in wired or wireless form, a WiFi interface, a Bluetooth interface or a mobile phone network interface. A network interface controller may also be understood as a communication unit 130. The device 100 may then also receive one or more data streams via the communication unit 130 for decoding using the codec 150 and further display on the local display 160 or for storing in the storage unit 170. The communication unit 130 may also be used to transmit data streams to a remote display on a remote device 165 via network 180. The network 180 may be a local network or a worldwide network such as the Internet. The user 192 may interact with the device 100 using a user interface 190. Typically, the user 192 interacts with the user interface 190 using a remote control 191, but other means of interaction are also possible. For example, the user 192 may interact with the device 100 using a touchscreen, a scroll wheel, buttons, a mouse or other pointer device, a keyboard etc.

The communication unit 130, the storage unit 170, the codec 150 and the processor 120 generally consume significant amounts of power during operation. To reduce the power consumption a buffer 110 may be used to temporarily store data streams such that component units, such as the storage unit 170 and the communication unit 130 may be powered down. This ensures that the codec 150 or the processor 120 may still process the data streams and that the quality of service expected by the user 192 is preserved. For example, in FIG. 1, the buffer 110 may be distributed, or split, amongst the storage unit 170, the communication unit 130, the codec 150 and the processor 120. This may be achieved by the use of control program running on the processor 120 and a system bus 140. The system bus 140 may interconnect all of the component units comprised within the device 100, allowing the processor 120 to control each component unit. Apparatus 195 may comprise the device 100 and the power supply 196 for supplying power to the storage unit 170, the communication unit 130, the codec 150 and the processor 120. The apparatus 195 may be realized as a Set-Top-Box device, a digital video recording device, a network-enabled device, a conditional access system, a portable audio player, a portable video player, a mobile phone, a DVD player, a CD player, a hard disk based media player, an Internet radio device, a computer, a television, a public entertainment device or an MP3 player. These examples are merely exemplary.

Figure 2:
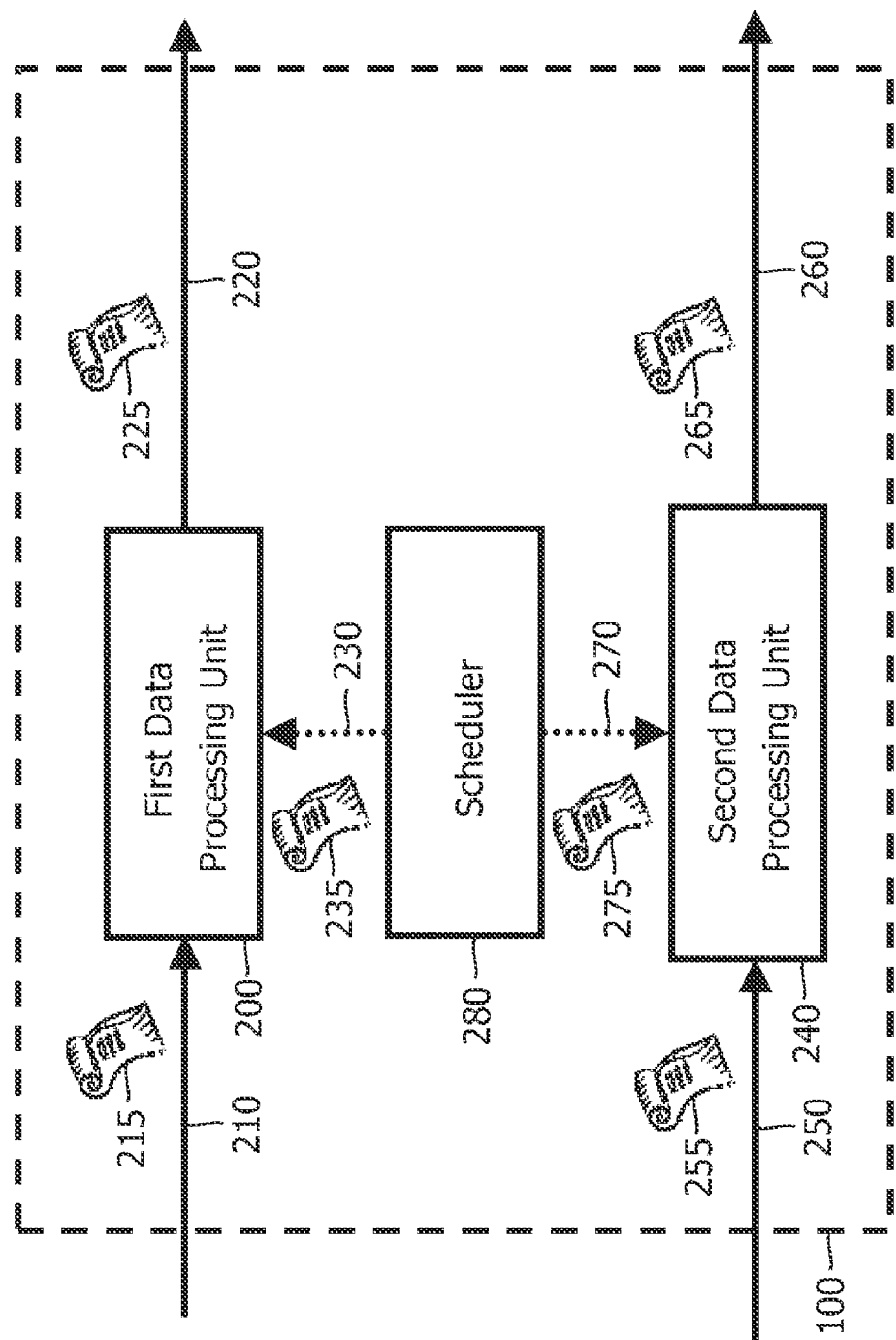
FIG. 2 illustrates a first embodiment of the invention.

In FIG. 2 an embodiment of the invention is shown comprising a first data processing unit 200, a second data processing unit 240 and a scheduler 280. The first data processing unit 200 or the second data processing unit 240 may be any component unit capable of processing data such as the storage unit 170, the communication unit 130, the codec 150, the processor 120 or an individual compression unit or decompression unit. In FIG. 2 the first data processing unit 200 has a first input 210 where first input data 215 is received. The first data processing unit 200 processes the first input data 215 according to a first process step to produce first output data 225 on a first output 220. As an example, the first process step may be a read operation when the first data processing unit 200 is a storage unit such as hard disk drive. To perform the first process step the first data processing unit 200 will generally require a significant amount of power. This will be discussed in detail later for situations where the first processing device 200 is a hard disk drive or a wireless network interface.

The second data processing unit 240, being similar to the first data processing unit 200, has a second input 250 where second input data 255 is received. The second data processing unit 240 processes the second input data 255 according to a second process step to produce second output data 265 on a second output 260. As an example, the second process step may be video decoding operation on the processor 120. To perform the second process step the second data processing unit 240 will also generally require a significant amount of power. The scheduler 280 controls the flow of data on the first data processing unit 200 and the second data processing unit 240. For the first data processing unit 200 this is achieved by generating a first schedule 235 that is communicated from the scheduler 280 to the first data processing unit 200 by first schedule input 230. Similarly, for the second data processing unit 240 a second schedule 275 is generated that is communicated from the scheduler 280 to the second data processing unit 204 by a second schedule input 270.

The scheduler 280 may generate the first schedule 235 and the second schedule 275 taking into account any deadlines for the first input data 215 and second input data 255. The scheduler 280 may also generate the first schedule 235 and the second schedule 275 based upon predetermined or hard-coded requirements or dynamically based upon the applications currently running on the processor 120 or requested by the user 192 at run time or during operation.

The scheduler 280 may also generate the first schedule 235 and the second schedule 275 such that the first data processing unit 200 and the second data processing unit 240 do not require significant power consumption concurrently. This can be achieved by taking into account any real-time deadlines for the first input data 215 and the second input data 255 alone and scheduling the processing on the first data processing unit 200 and the second data processing unit 240 sequentially. This is useful when the scheduler 280 has no information regarding the power consumption in various operating modes of the first processing device 200 or the second data processing device 240. By ensuring that the peak power consumed by the device 100 is limited the efficiency of the device 100 is improved. When the device 100 is battery operated reducing the peak power requirements increases the battery capacity and therefore the operating time. Also when power converters are applied, as in common in such devices, the power converter may be operated in a region of higher efficiency by regulating the peak power. Such an increase in efficiency also benefits device with external power supplies since less power is wasted.

Alternatively, the scheduling of the processing on the first data processing unit 200 and the second data processing unit 240 may be scheduled simultaneously under the condition that any periods of high power consumption by either of the data processing units does not occur concurrently. For example, during a period of high power consumption by the first data processing unit 200, the second data processing unit 240 must operate in a mode consuming a low, or no, power and vice versa.

Figure 11:
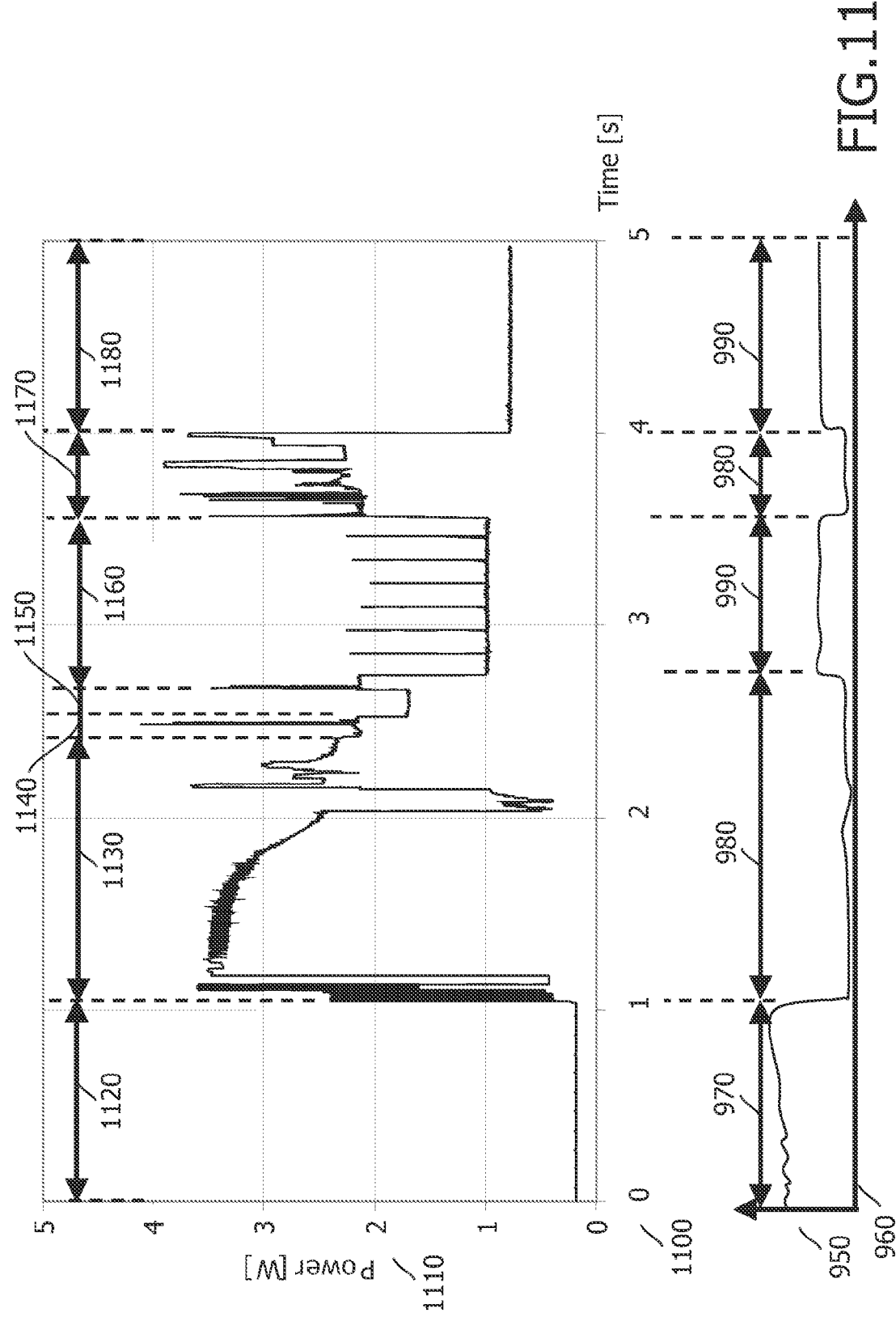
FIG. 11 illustrates power consumption traces of a hard disk drive and a processor.

In FIG. 11, a power consumption trace is illustrated for the embodiment of FIG. 2 where the first processing device 200 is a hard disk drive and the second data processing device 240 is a processor. The upper horizontal axis 1100 and the lower horizontal axis 960 of FIG. 11 both indicate time in seconds. The upper vertical axis 1110 of FIG. 11 is power in Watts and the lower vertical axis 950 is power, however no units are shown. The trace illustrated in FIG. 11 begins with the hard disk drive in standby mode 1120. This is the lowest power mode of all those illustrated in FIG. 11. Powering off the hard disk drive completely could save power further (this is not shown in FIG. 11). During such a period the scheduler 280 may schedule the second data processing device 240, for example, the processor 120 or the codec 150, to run in an operating mode consuming a higher current and shown in region 970. This may even involve pre-emptively decoding audio/video data for situations when the scheduler 280 is already aware of impending deadlines for the first input data 215 which will necessitate a reduction in power consumption consumed by the second data processing device 240. Such a lower power consumption mode necessitated of the second data processing unit 240 is shown in region 980 of FIG. 11 and occurs upon the hard disk drive receiving a command. The hard disk drive may then enter a load mode 1130. Generally this involves spinning the disk(s) inside the hard disk drive to normal operating speed and placing the read/write head in the data area of the disk. This may involve a mere seek action from a so-called landing zone or by unloading the read/write head from a ramp. A command may be executed in a read/write mode 1140. Generally a hard disk drive will remain in a performance idle mode 1150, where the hard disk drive waits for a certain period of time for further commands. In this mode the hard disk drive may respond immediately to the commands.

In an active idle mode 1160 the hard disk drive may power down as much of the periphery components as possible. For example, it may stop active track following, shut down read/write channel electronics etc. Within such regions the scheduler 280 may schedule the second data processing unit 240 to run at an intermediate power consumption mode as shown by region 990 in FIG. 11. If no further commands are received, the hard disk drive may unload the read/write head. This is typically performed in ramp load hard disk drives used in mobile or portable applications. The unload mode 1170 involves moving the read/write to the ramp. Since this draws power, the scheduler 280 may necessitate a period of low power consumption by second adapt processing unit 240 again shown as region 980 in FIG. 11. The power consumption is reduced in a low power idle mode 1180 since the read/write head is no longer flying in close proximity to the disk surface and the "drag" is reduced. The spindle may also be run at a lower speed than normal operation and further periphery electronics may be disabled. In region 1180 the scheduler 280 may allow the second data processing device to return to operating at an intermediate level shown by region 990 in FIG. 11. The trace illustrated in FIG. 11 also indicates the duration required to perform a power mode transition. For example, the duration of the load mode 1130 is the duration required to transition from standby mode 1120 to read/write mode 1140.

Whilst it is possible for the scheduler 280 to generate the first schedule 235 and the second schedule 275 as detailed as shown in FIG. 11, i.e. at sub-second intervals, it may be preferable for the scheduler 280 to operate at a coarser level, such as, over time duration of multiple seconds. This requires less detailed information on the power consumption of the individual components processing units.

Figure 3:
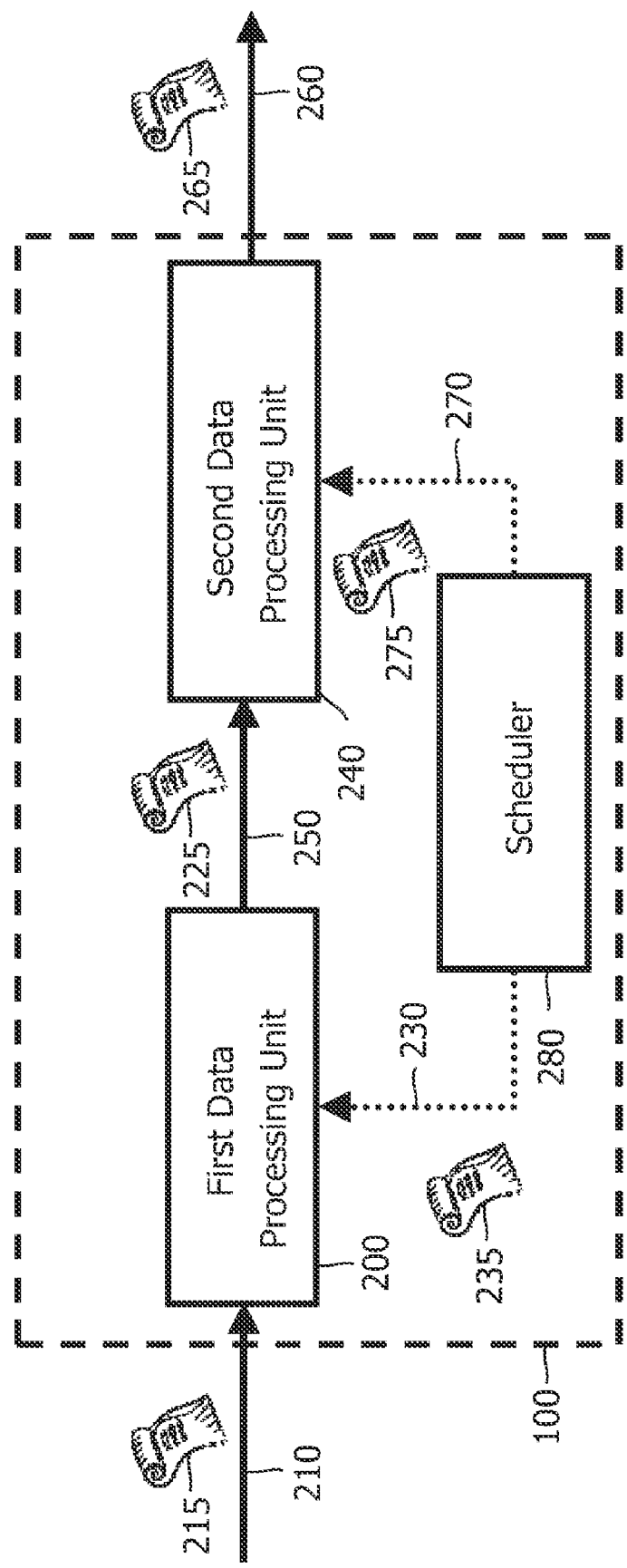
FIG. 3 illustrates an embodiment of the invention for sequential data processing.

A further embodiment of the invention is shown in FIG. 3. In the embodiment of FIG. 3 the first data processing unit 200 is sequentially connected to the second data processing unit 240. The first output data 225 is therefore communicated directly to the second input 250. This configuration would enable the decoding of audio/video on the processor 120 operating as the second data processing unit 240 when read from a hard disk drive operating as the first data processing unit 200.

Figure 4:
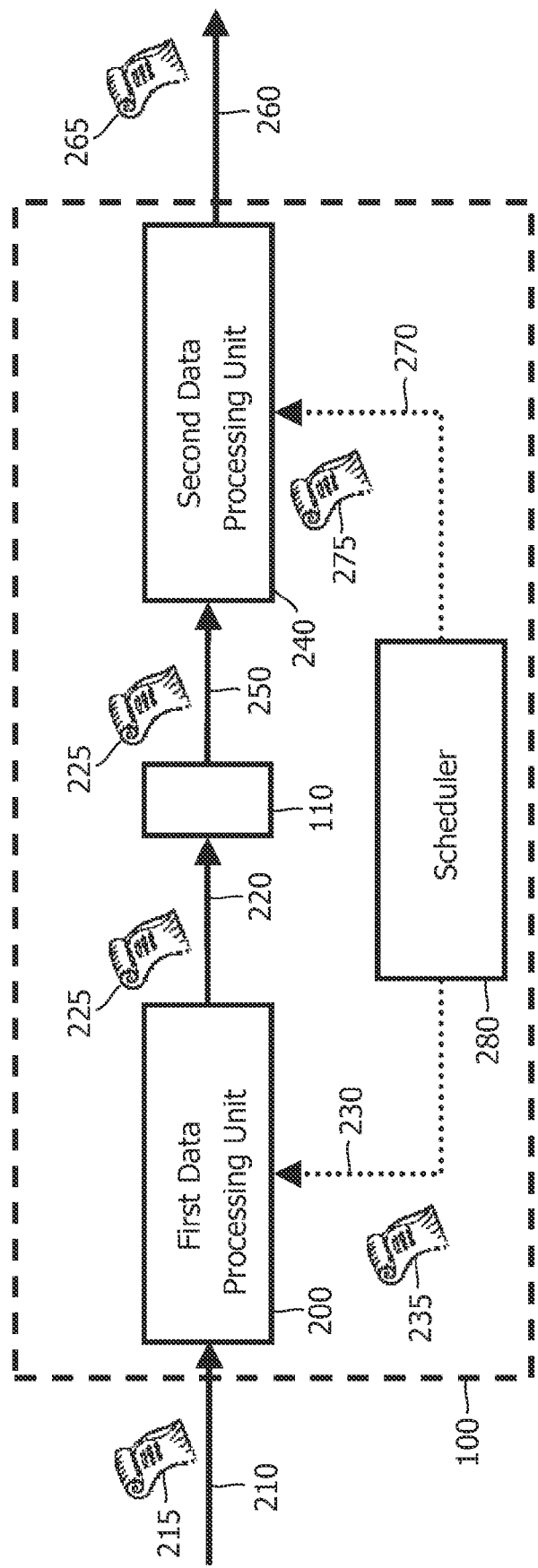
FIG. 4 illustrates an embodiment of the invention making use of buffering.

FIG. 4 shows another embodiment wherein buffer 110 is used as temporary storage between the sequentially connected first data processing unit 200 and the second data processing unit 240 of FIG. 3. The first output data 225 is communicated from the first data processing unit 200 to the buffer 110 via first output 220. This enables the first data processing unit 200 to be placed in a very low power mode, or even switched off, for a significant period of time and therefore further improves the power efficiency. The buffer 110 allows the first data processing unit 200 and the second data processing unit 240 to be effectively decoupled even when sequentially connected. The second data processing unit 240 reads the first output data 225 from the buffer 110 via second input 250. This also allows the second processing device 240 to operate at a faster or slower rate than real-time, as necessary, offering further opportunities to limit the peak power consumption of the device 100.

Figure 5:
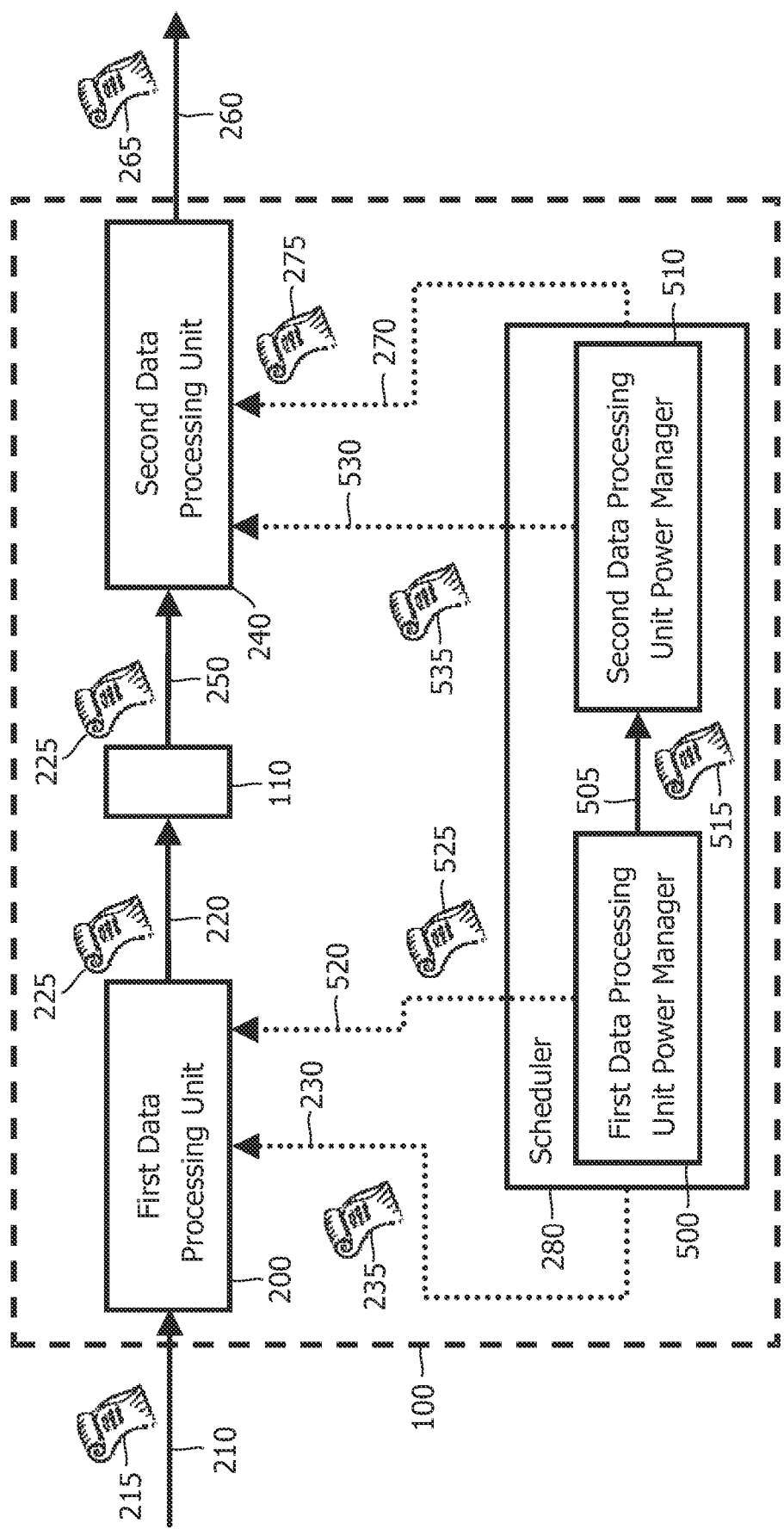
FIG. 5 illustrates an embodiment of the invention capable of actively controlling power consumption.

In the embodiment shown in FIG. 5 the scheduler 280 comprises a first data processing unit power manager 500 and a second data processing unit power manager 510. The first data processing unit power manager 500 and the second data processing unit power manger 510 are connected via power manager connection 505. The power manager connection 505 allows the first data processing unit power manager 500 and the second data processing unit power manger 510 to communicate information necessary to correlate and schedule and changes made to the operating modes and thereby the power consumption of the component units. In FIG. 5 a mode of operation of the first data processing unit 515 is communicated. When the first data processing unit 200 is a hard disk drive the mode of operation of the first data processing unit 515 communicated may be, for example, time intervals for reading/writing and sleeping and power-up notifications. The information communicated may also be bi-directional, although this is not shown in FIG. 5. The first data processing unit power manager 500 controls the operating mode of the first data processing unit 200 via a first power mode setting connection 520. A first power setting 525 is communicated via the first power mode setting connection 520. When the first data processing unit 200 is a hard disk drive the first power setting 525 may comprise data requests to pre-fetch required data, i.e. first input data 215, from the disk, such that the first input data 215, or a processed version of the first input data 215, i.e. first output data 225, may be stored in the buffer 110. The hard disk drive may then be powered down, again under control of the first data processing unit power manager 500. The first data processing unit power manager 500 may have predetermined application characteristics allowing a predetermined number of audio/video streams of predetermined bitrates to be supported given any constraints in size of the buffer 110, or performance requirements of the first data processing unit 200 or the second adapt processing unit 240.

The second data processing unit power manager 510 controls the operating mode of the second data processing unit 240 similarly to the first data processing unit power manager 500, however, via a second power mode setting connection 530. A second power setting 535 is communicated via the second power mode setting connection 530. When the second data processing unit is processor 120, the second power setting 535 may indicate the desired operating speed of the processor 120 at each moment in time, or may comprise a number of predetermined operating speeds, such as a low speed and a high speed.

Figure 6:
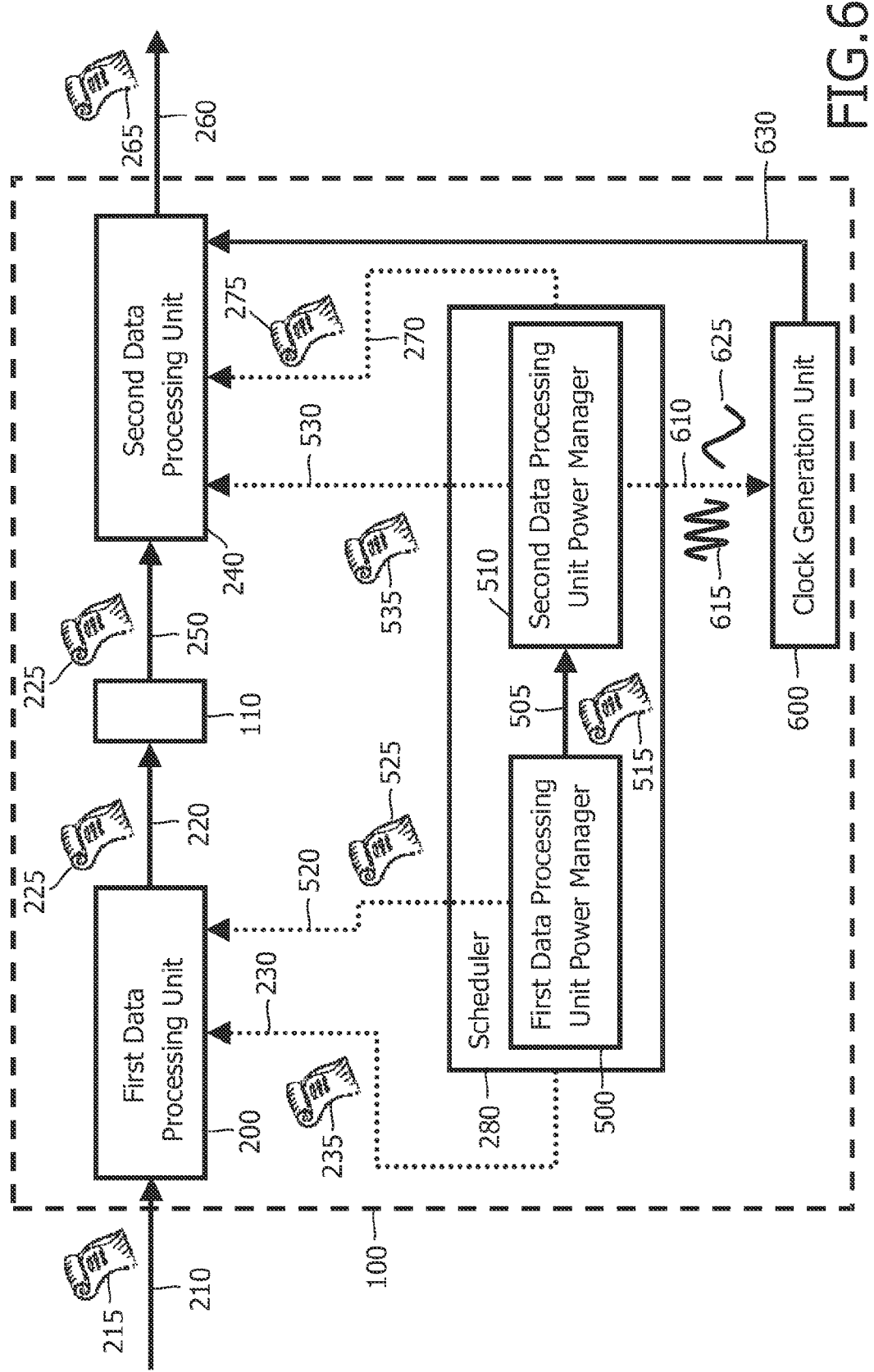
FIG. 6 illustrates an embodiment of the invention suitable for processors.

In the embodiment of FIG. 6 the device 100 further comprises a clock generation unit 600. The clock generation unit 600 generates a clock on a second power setting connection 630. The clock may be influenced by a frequency control 610. The frequency control 610 may be arranged such that the clock may be a continuously variable clock frequency, or a predetermined number of discrete clock frequencies. For example, the frequency control 610 may be a high frequency setting 615 or a low frequency setting 625. This is especially useful when adjusting the clock may influence power consumption of the second data processing unit 240. This may be the case when the second data processing unit 240 is a processor, such as the processor 120, or a compression/decompression unit, such as the codec 150.

Considering further the embodiment of FIG. 6, a typical application of the device 100 may be as a portable video playback device. In such an application the first data processing device 200 may be a non-volatile storage unit, such as the storage unit 170, and the second data processing device 240 may be embodied as a processor, such as the processor 120. To achieve system level power management in the device 100 all unit components must cooperate. When a video playback application starts, the application may communicate workload requirements to the second data processing unit 240, either directly or via the second data processing unit power manager 510. When the second data processing unit 240 is embodied as a processor, such as the processor 120, the second data processing unit power manager 510 may compute and set the lowest clock frequency capable of meeting the performance requirements of the application.

When the first data processing unit 200 is embodied as the storage unit 170 the first data processing unit power manager 500 may allocate portions of the buffer 110 and calculate time intervals of and between consecutive operating mode changes of the storage unit 170. These may be, for example, times to spin up a hard disk drive, or time spent reading/writing data. The first data processing unit power manager 500 may possess knowledge on physical characteristics of the underlying first data processing unit 200. The first data processing unit power manager 500 may inform the second data processing unit power manager 510 of such time intervals making use of the mode of operation of the first data processing unit 515. The second data processing unit power manager 510 may then re-compute one or more clock frequency settings. For example, the second data processing unit power manager 510 may compute a low frequency setting 625 for use when the storage unit 170 is consuming significant power, i.e. is spinning, reading or writing, and a high frequency setting 615 for use when the storage unit 170 is in a low power state such that the processor 120 is capable of decoding extra video frames to be displayed whilst the processor 120 is forced to operate at a low frequency.

The first data processing unit power manager 500 may inform the second data processing unit power manager 510 when the first power setting 525 is about to change and thereby operate in a synchronous manner with the second data processing unit power manager 510, although synchronous operation is not the only manner of operation possible. The second data processing unit power manager 510 may use such a trigger indicating a forthcoming event to transition the processor 120 into a low power state by setting a low frequency setting 625 on the second power setting connection 630. This allows the processor 120 to enter a sleeping state or low operating clock frequency state. The storage unit 170 will eventually complete all required actions and transition into a low power operating state again under control of the first data processing unit power manager 500. The second data processing unit power manager 510 may then wake the processor 120 up. This cycle may repeat until playback of the video is complete.

Figure 7:
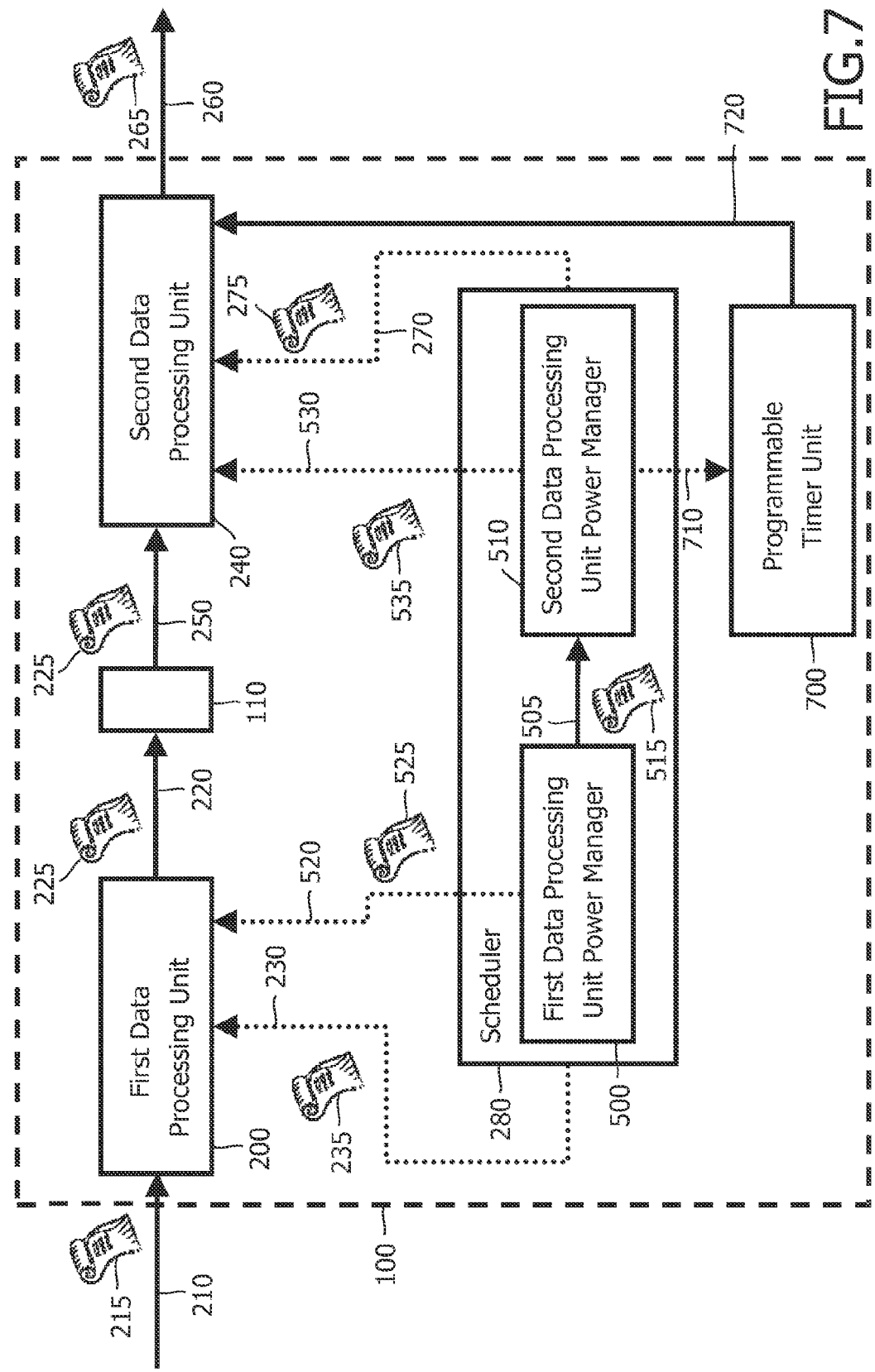
FIG. 7 illustrates another embodiment of the invention suitable for processors.

In FIG. 7 the device 100 further comprises a programmable timer unit 700 having a timer control 710 for controlling or programming the programmable timer unit 700 and a wake-up signal output 720 for awakening the second data processing unit 240. The embodiment of FIG. 7 may operate in a similar manner to that just described for the embodiment of FIG. 6. Indeed, again, taking the video playback application as an example the second data processing unit 240, embodied as the processor 120 in the example, may be transitioned to a sleep state. Prior to transitioning to the sleep state the second data processing unit power manager 510 may program the programmable timer unit 700 using timer control 710. After expiration of the programmed timer period the programmable timer unit 700 may generate an interrupt on the wake-up signal output 720 to wake the processor 120. Such an embodiment may necessitate that, for example, the first data processing unit 200 is capable of operating independently of the second data processing unit 240. This is common when Direct Memory Access, DMA, is supported.

Figure 8:
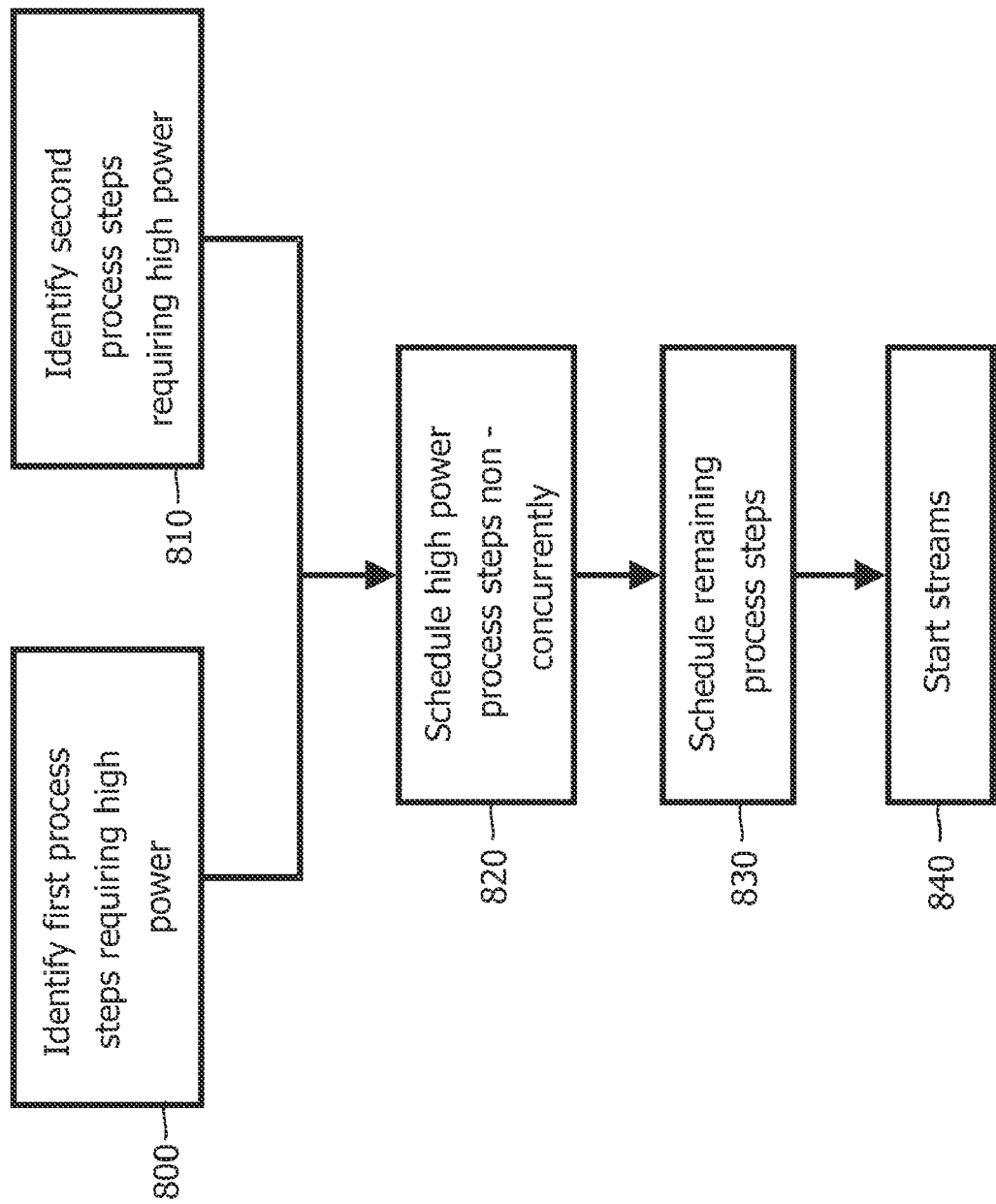
FIG. 8 illustrates a flowchart according to an embodiment of the invention.

The invention may be embodied as software running on a processor, for example, the processor 120. Such an embodiment may include one or more component units embodied as software running on the processor 120. FIG. 8 shows a flow chart indicating a method according to an embodiment of the invention. In step 800 any or all first process steps may be identified that require significant, or high, power consumption. Such identification may be based on predetermined characteristics of the first data processing unit 200 or may also be measured during operation. In step 810 a similar identification as that for step 800 occurs, but here for the second process steps, for example, for the process steps performed by the second data processing unit 240. In step 820 the information regarding the first process steps and the second process steps that may consume high power is used to schedule the first process steps and the second process steps such that no high power process steps occur concurrently, thereby reducing the peak power load on a battery or power converter. In step 820 the real-time deadlines are also taken into account to ensure that an acceptable quality of service is provided. In step 830 any remaining process steps that do not impact the power consumption significantly may be scheduled. Steps 820 and 830 may be merged into a single scheduling step. In step 840 the scheduling is complete and the audio/video streams may be started, or further processed should they already be running.

Figure 12:
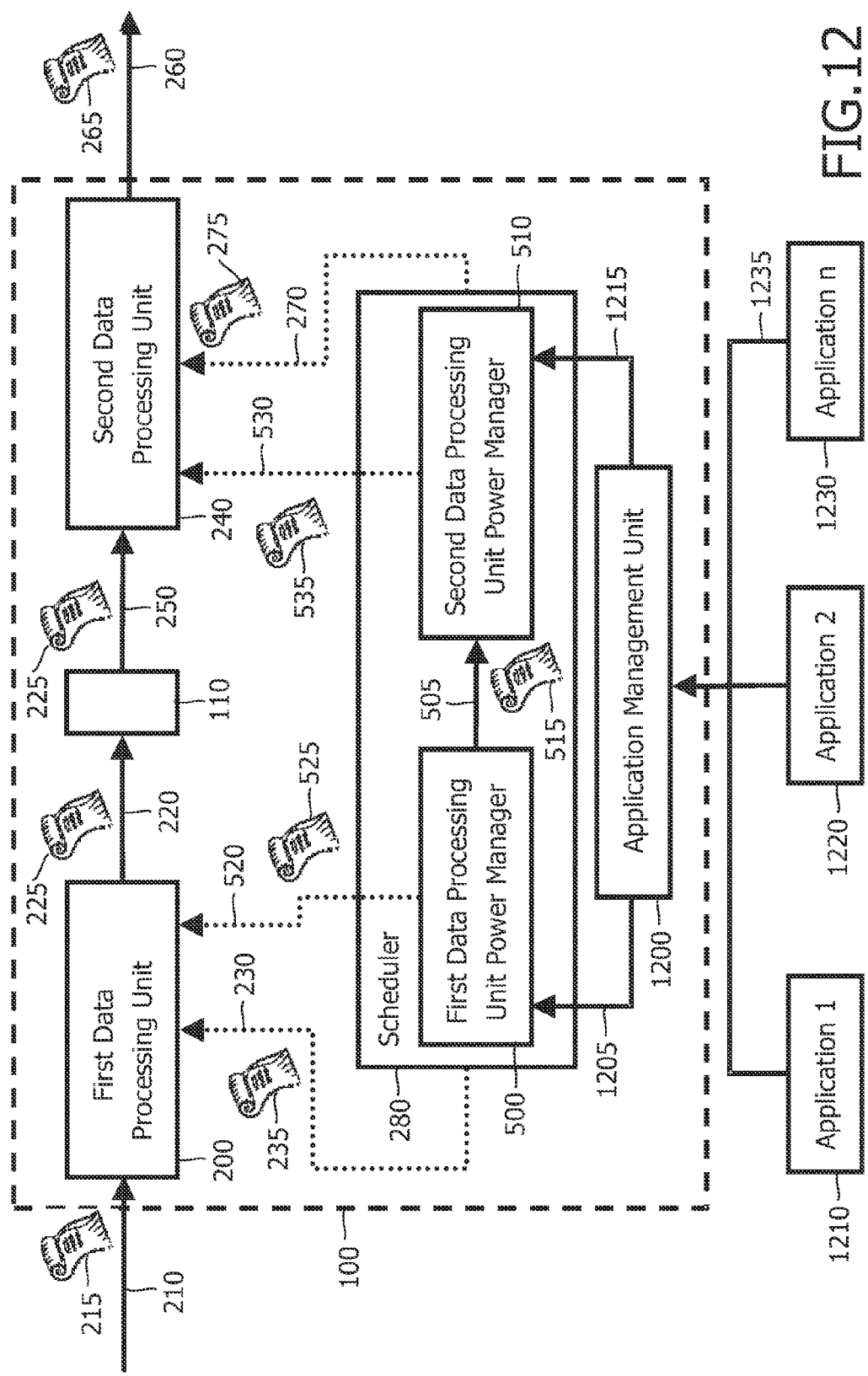
FIG. 12 illustrates an embodiment of the invention capable of dynamic operation with respect to running applications.

In FIG. 12 an embodiment is shown comprising an application management unit 1200. The application management unit 1200 manages currently running applications, such as first application 1210, second application 1220 etc. Any application may inform the application management unit 1200 of any requirements it may have regarding bitrates etc. These may be communicated as requested resources 1235. The application management unit 1200 may communicate input/output, or I/O bit rate requirements 1205 to the first data processing unit power manager 500. The application management unit 1200 may also communicate CPU workload requirements 1215 to the second data processing unit power manager 510. Using the I/O bit rate requirements 1205 and the CPU workload requirements 1215 the first data processing unit power manager 500 and the second data processing unit power manager 510 can assist in the scheduling of the process steps for optimum power consumption.

Figure 13:
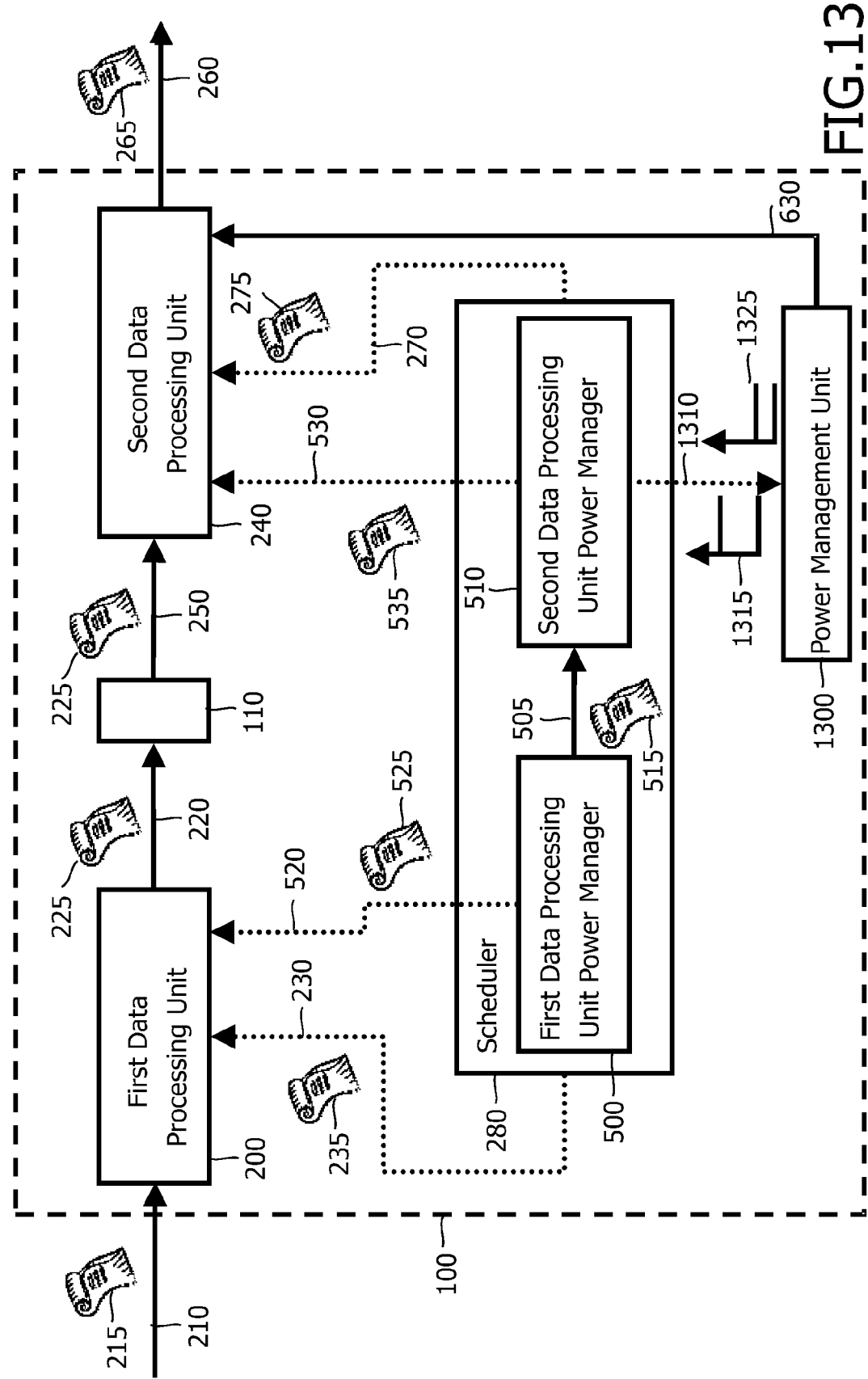
FIG. 13 illustrates a further embodiment of the invention suitable for processors.

In the embodiment of FIG. 13 the device 100 further comprises a power management unit 1300. The power management unit 1300 generates a power control signal on the second power setting connection 630. The power control signal may be influenced by a power control 1310. The power control 1310 may be arranged such that the power control signal may be a continuously variable clock frequency, a predetermined number of discrete clock frequencies, and/or a discrete or variable voltage level. For example, the power control 1310 may be one or more of the high frequency setting 615 or the low frequency setting 625 from FIG. 6, or the low voltage setting 1325 or the high voltage setting 1315. Other values are also possible. This is especially useful when adjusting a clock or voltage level that may influence power consumption of the second data processing unit 240, such as in the voltage and frequency scaling of processors. This may be the case when the second data processing unit 240 is a processor, such as the processor 120, or a compression/decompression unit, such as the codec 150.

In the embodiment of FIG. 13 a typical application of the device 100 may be in a portable video playback device. In such an application the first data processing device 200 may be a non-volatile storage unit, such as the storage unit 170, and the second data processing device 240 may be embodied as a processor, such as the processor 120. To achieve system level power management in the device 100 all unit components must cooperate. When a video playback application starts, the application may communicate workload requirements to the second data processing unit 240, either directly or via the second data processing unit power manager 510. When the second data processing unit 240 is embodied as a processor, such as the processor 120, the second data processing unit power manager 510 may compute and set the lowest clock frequency capable of meeting the performance requirements of the application.

When the first data processing unit 200 is embodied as the storage unit 170 the first data processing unit power manager 500 may allocate portions of the buffer 110 and calculate time intervals of and between consecutive operating mode changes of the storage unit 170. These may be, for example, times to spin up a hard disk drive, or time spent reading/writing data. The first data processing unit power manager 500 may possess knowledge on physical characteristics of the underlying first data processing unit 200. The first data processing unit power manager 500 may inform the second data processing unit power manager 510 of such time intervals making use of the mode of operation of the first data processing unit 515. The second data processing unit power manager 510 may then re-compute one or more clock frequency settings or one or more processor voltages. The scaling of clock frequency, voltage or both enables a processor to adjust the performance versus power consumption for optimum performance. In a common manner of operation when power is to be reduced the clock frequency may be scaled down, then the voltage is also scaled down. To revert to a higher performance mode the voltage may be scaled up then the frequency may also be scaled up. For example, the second data processing unit power manager 510 may compute a low voltage setting 1325, and/or the low frequency setting 625 from FIG. 6, for use when the storage unit 170 is consuming significant power, i.e. is spinning, reading or writing, and a high voltage setting 1315, and/or the high frequency setting 615, for use when the storage unit 170 is in a low power state such that the processor 120 is capable of decoding extra video frames to be displayed whilst the processor 120 is forced to operate at a low voltage and/or frequency.

The first data processing unit power manager 500 may inform the second data processing unit power manager 510 when the first power setting 525 is about to change and thereby operate in a synchronous manner with the second data processing unit power manager 510, although synchronous operation is not the only manner of operation possible. The second data processing unit power manager 510 may use such a trigger indicating a forthcoming event to transition the processor 120 into a low power state by setting the low frequency setting 625 and/or the low voltage setting 1325 on the second power setting connection 630. This allows the processor 120 to enter a sleeping state or low operating clock frequency state. The storage unit 170 will eventually complete all required actions and transition into a low power operating state again under control of the first data processing unit power manager 500. The second data processing unit power manager 510 may then wake the processor 120 up. This cycle may repeat until playback of the video is complete.

In any of the above embodiments the first data processing unit 200 or the second data processing unit 240 may be network interface, such as the communication unit 130. The communication unit 130 may also consume significant power during operation.

Figure 9:
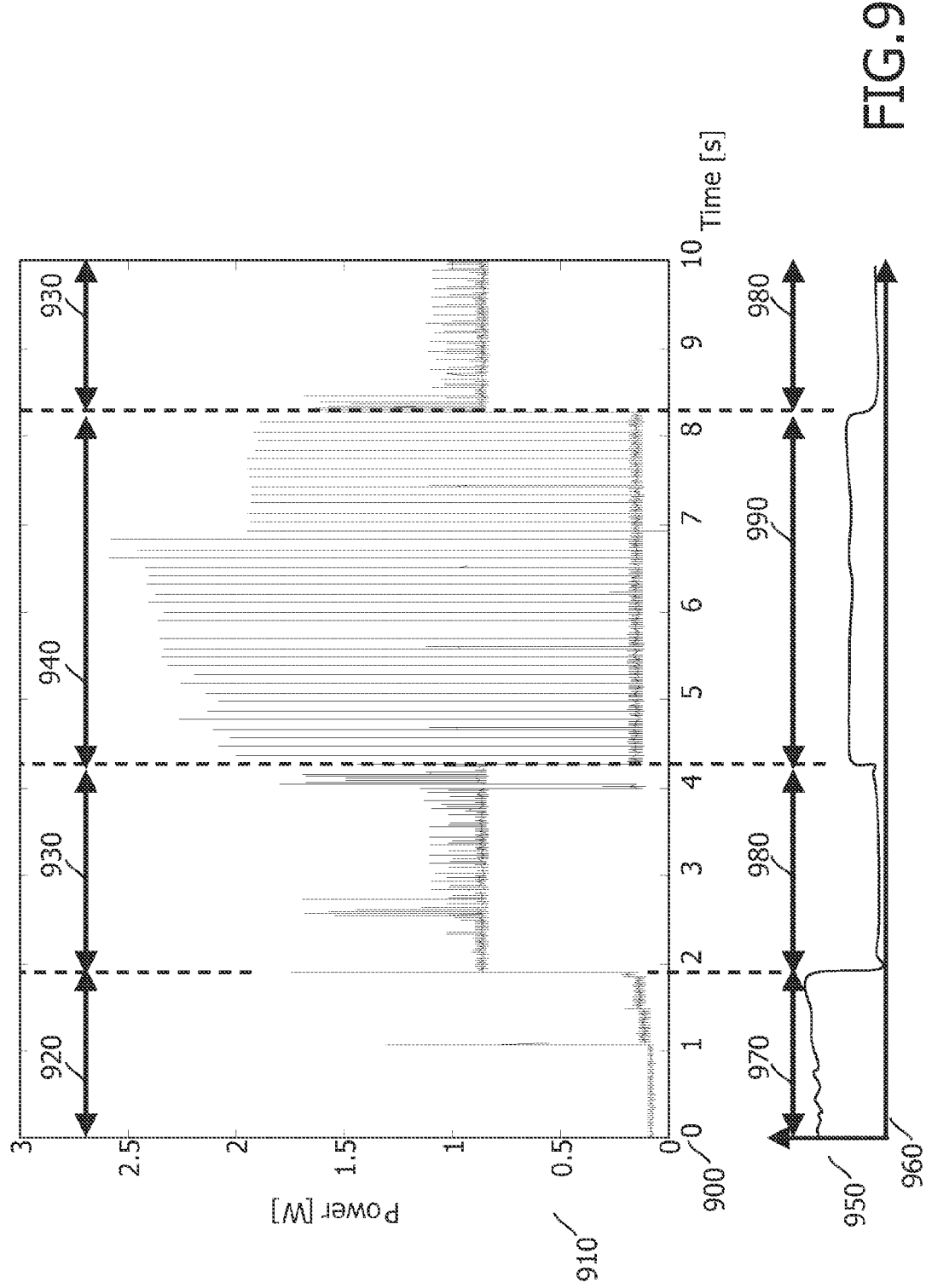
FIG. 9 illustrates power consumption traces of a first wireless network card and a processor.

For example, in FIG. 9 a power consumption trace is illustrated for a first wireless interface card. The upper horizontal axis 900 and the lower horizontal axis 960 of FIG. 9 is time in seconds. The upper vertical axis 910 of FIG. 9 is power in Watts whilst the lower vertical axis 950 merely represents power without units. The upper trace illustrated in FIG. 9 begins with the first wireless interface card in power-off mode 920. To reduce further any power drain by the mere interfacing of the first wireless card to a host, the first wireless card may be fully isolated using, for example field effect transistors, i.e. FETs, or other suitable means. The lower trace of FIG. 9 indicates the power consumption of, for example, the processor 120. During region 970 the first wireless interface card is consuming low power so the processor 120 may consume a higher power. After a period of time in power off mode 920 the first wireless card transitions to an active mode 930. The processor 120 may then transition to a low power state indicated by region 980. Thereafter, the first wireless card transitions to a power save mode 940. This consumes an intermediate level of power. The processor 120 may then be set to an intermediate clock level as shown by region 990 in FIG. 9. The transitioning of power modes of the first wireless interface card is generally under control of firmware within the card, or under control of a host system. Signals may be intermittently transmitted and/or received in the power save mode 940. If necessary, the first wireless card may transition again to the active mode 930. This may necessitate that the processor 120 be transitioned to a low power state as shown again in region 980. Typical measured values for the power consumption and the power mode transition durations of the first wireless card are shown in Table 1. The first data processing unit power manager 500 or the second data processing power manager 510 may be aware of one or more of the parameters shown in Table 1.

TABLE 1

Power consumption and mode cycle times of a first wireless interface device *measured using a 100 ms beacon interval.

| Mode | Average Power [mW] | Duration [ms] |
|---|---|---|
| AM | 860 | — |
| PS | 160* | — |
| AM to PS | 815 | 320 |
| PS to AM | 815 | 280 |
| Off to AM | 520 | 1750 |
| Transmit | 1280 | — |
| Receive | 1090 | — |

AM is Active mode, PS is Power Save mode.

Figure 10:
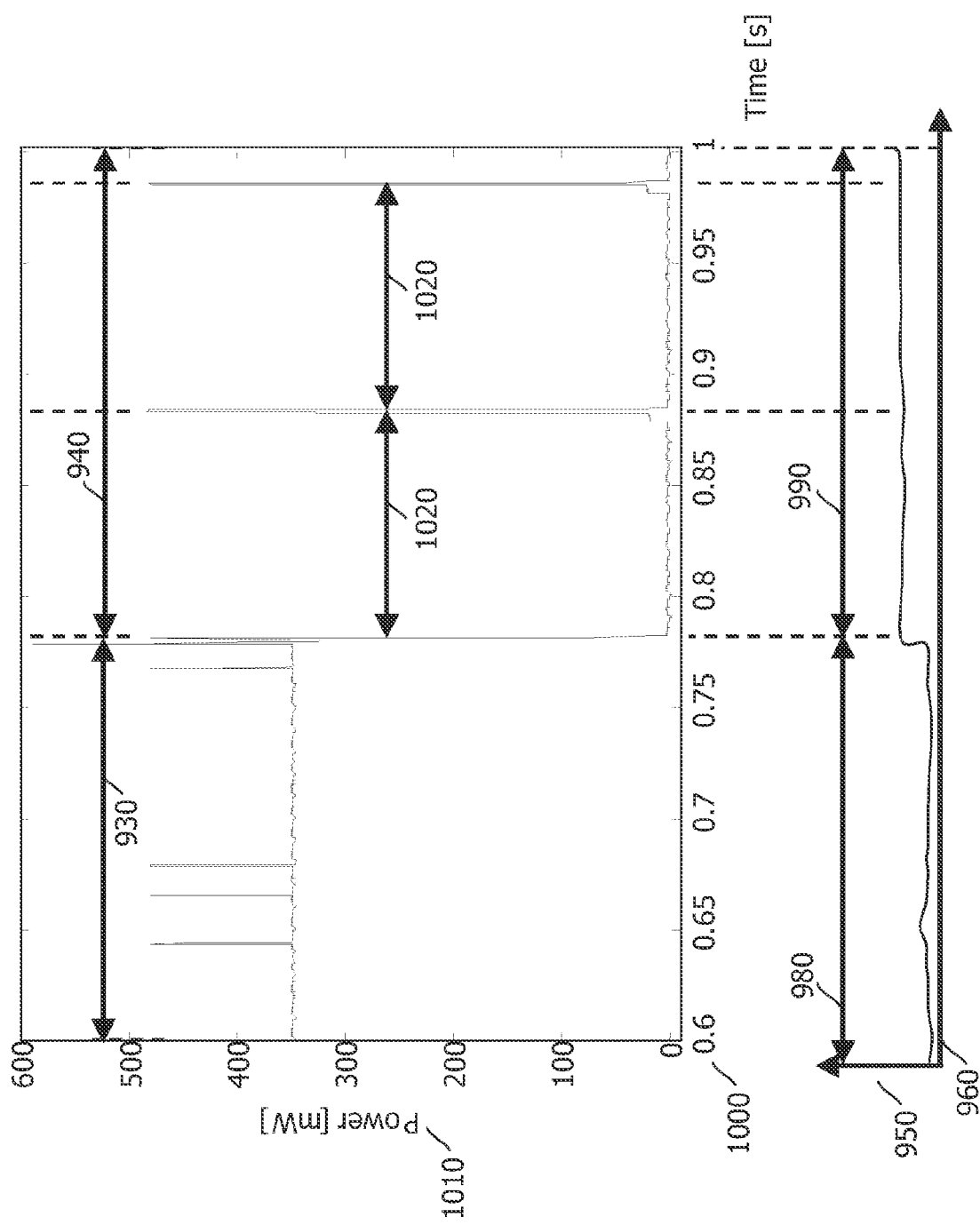
FIG. 10 illustrates power consumption traces of a second wireless network card and a processor.

In FIG. 10 a power consumption trace is illustrated for a second wireless interface card. The upper horizontal axis 1000 and the lower horizontal axis 960 of FIG. 10 is time in seconds. The upper vertical axis 1010 of FIG. 10 is power in milliWatts. As in FIG. 9, the lower vertical axis 950 is power in arbitrary units. The upper trace illustrated in FIG. 10 begins with the second wireless interface card in active mode 930. The lower trace illustrated in FIG. 10 may be the power consumption of the processor 120, which during region 980 is shown to be at a low power consumption level. After a period of time in active mode 930 the second wireless card transitions to a power save mode 940. Again, this is generally under control of firmware within the second wireless card, or under control of a host system. Signals may be intermittently transmitted and/or received in the power save mode 940. Such signals may be beacon signals transmitted at a beacon interval 1020. When the second wireless interface card is operating in power save mode 940 the processor 120 may operate at a higher frequency as shown in region 990. Typical measured values for the power consumption of the second wireless card are shown in Table 2. The second power consumption characteristics 650 may comprise one or more of the parameters shown in Table 2.

TABLE 2

Power consumption of a second wireless interface device *measured using a 100 ms beacon interval.

| Mode | BaseBand + MAC Layer Power [mW] | RF Power [mW] | Total Power [mW] |
|---|---|---|---|
| Transmit | 90 | 450 | 540 |
| Receive | 170 | 280 | 450 |
| AM | 70 | 280 | 350 |
| PS* | 3.5 | 5.5 | 9 |

AM is Active mode, PS is Power Save mode.

The measurements shown in Table 2 are a worst-case situation. During a data transfer using a commonly used protocol, such as TCP/IP, the average transmit power consumption will be lower. As an example, from power up until ready it was measured that 140 mJ of energy was consumed during 2.3 seconds.

Figure 14:
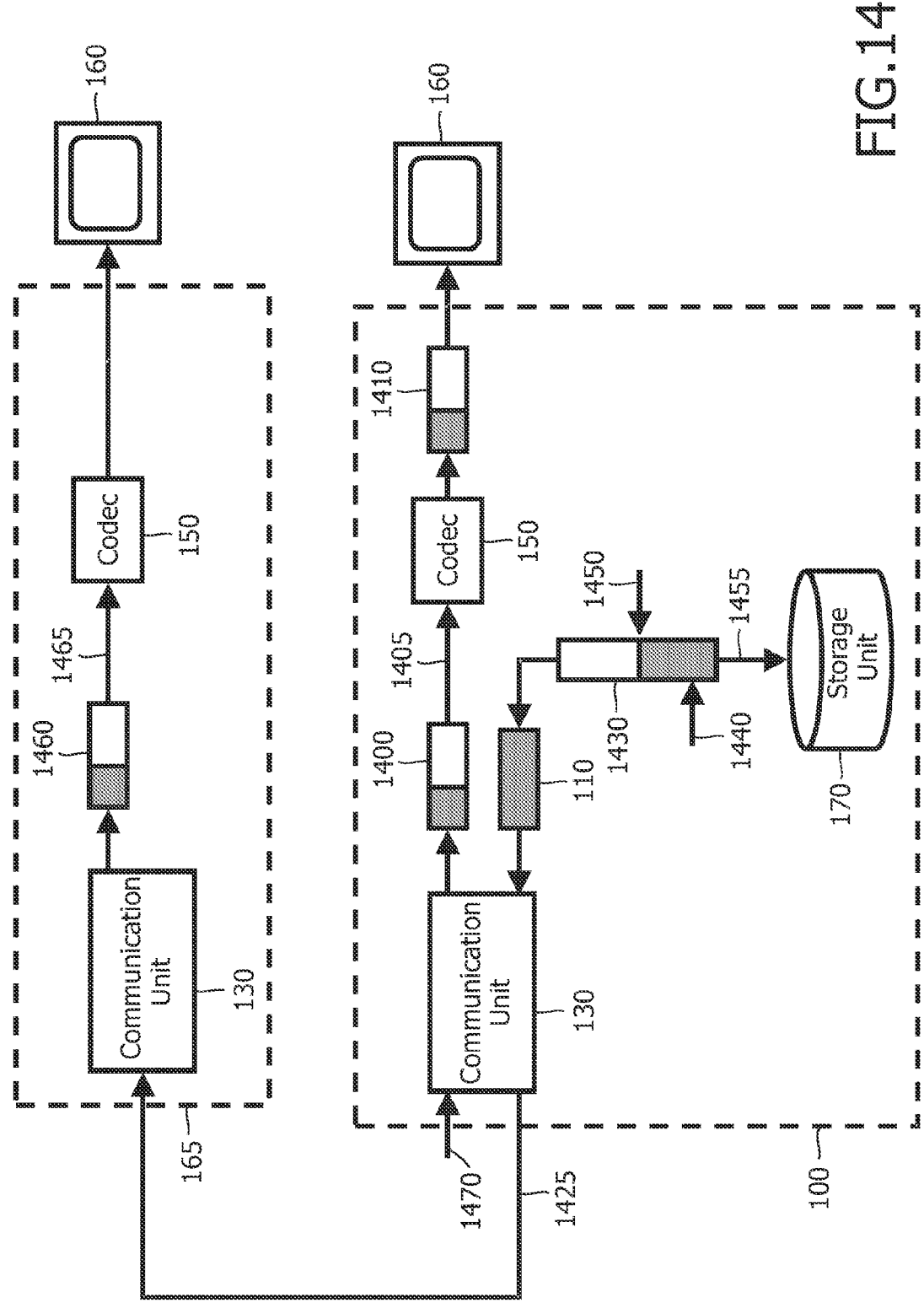
FIG. 14 illustrates a further embodiment of the invention.

An embodiment making use of a wireless network interface is shown in FIG. 14. Here a client/server device, the device 100, may be serving a first stream 1425 to a wireless client, the remote device 165, while receiving a second stream 1470 wirelessly. The client may also receive data in bursts via the communication unit 130 which may be a WiFi interface and may buffer the data in client buffer 1460. The client/server device may serve the first stream 1425 via the storage unit 170 using a stream buffer 1430. The stream buffer 1430 may be refilled only when its filling drops below stream buffer threshold 1440. Once full, the storage unit 170 may be spun down to save energy. The buffer 110 may be added to prevent WiFi activity of the communication unit 130 overlapping with storage unit activity. Without it, the stream buffer threshold 1440 would be hit during WiFi activity causing the storage unit 170 to spin up. The buffer 110 may be dimensioned such that it gets refilled during the idle periods of the WiFi activity. Since only a refill action of the buffer 110 would initiate a disk spin up, the disk spins up only during the WiFi idle periods.

Figure 15:
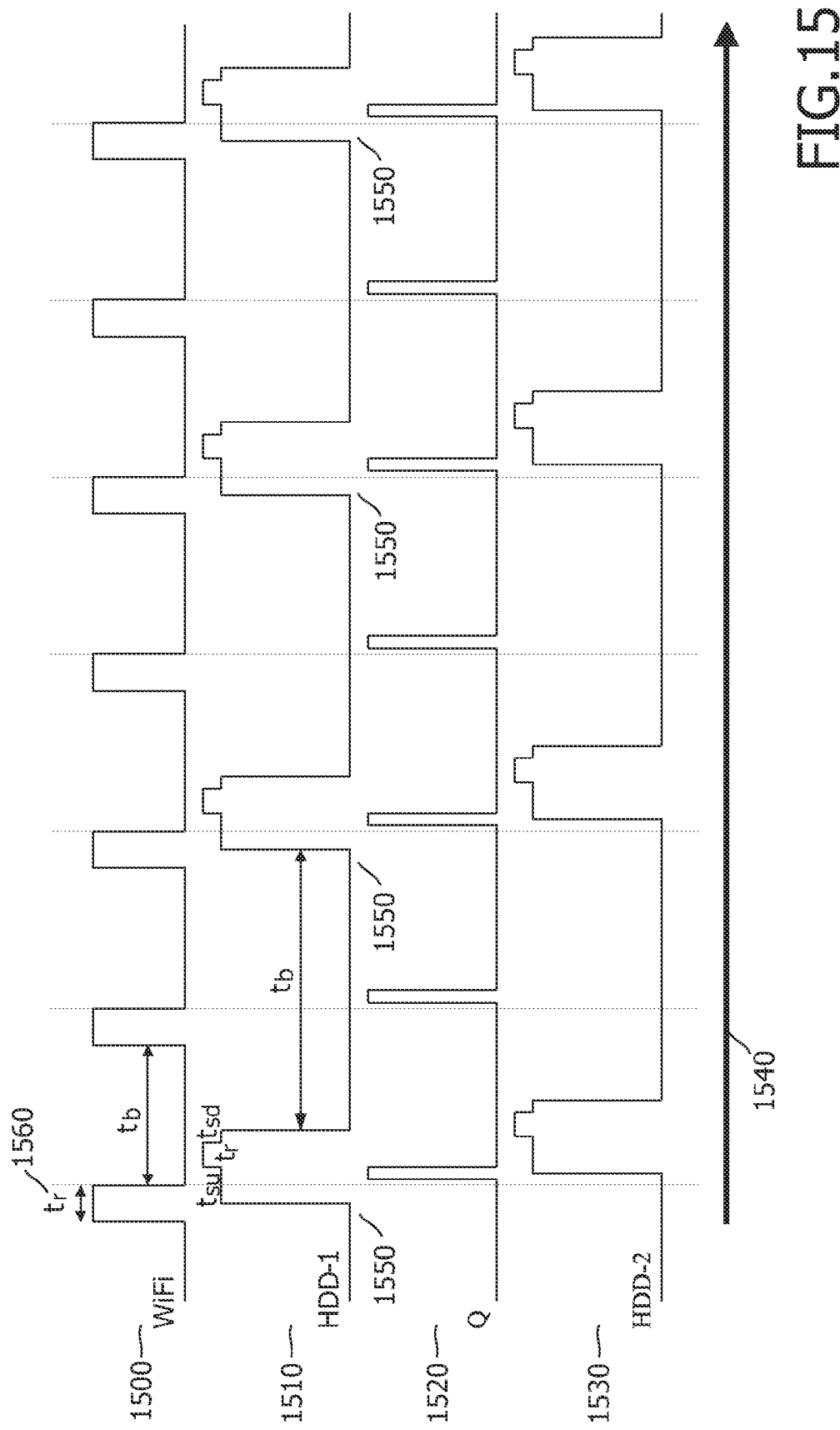
FIG. 15 illustrates a timeline indicating the activity of component units of the embodiment of FIG. 14.

The activity of the major components of the embodiment of FIG. 14 is shown in FIG. 15. The communication unit 130 activity is shown in the first trace 1500 and a period of activity, $t_r$, 1560 is illustrated. Without any scheduling or coordination between the communication unit 130 and the storage unit 170 both units may operate concurrently drawing significant current from a source of power. This is shown in the second trace 1510, at concurrent points 1550. The activity of the buffer 110 is shown in the third trace 1520. The buffer 110 may be used to ensure that the activity of both units do not occur concurrently. This can be seen from the fourth trace 1530. In all of the traces of FIG. 15 the horizontal axis 1540 is time.

It is beneficial if the WiFi activity of the communication unit 130 would fit in the idle time of the storage unit 170, and vice versa. This condition can be formulated as follows.

$$t_{r,wifi} < t_{b,hdd} - (t_{su} + t_{sd}) \quad (1)$$

$$t_{b,wifi} < t_{r,hdd} - (t_{su} + t_{sd}) \quad (2)$$

with $t_{r,wifi} = b_{w1}/(r_w - r_1)$, $t_{b,wifi} = b_{w1}/r_1$, $t_{r,hdd} = b_d/(r_d - r_1)$ and $t_{b,hdd} = b_d/r_1$ equations (1) and (2) become $$\frac{b_{w1}}{r_w - r_1} < \frac{b_d}{r_1} - (t_{su} + t_{sd}) \quad (3)$$

and $$\frac{b_{w1}}{r_1} > \frac{b_d}{r_d - r_1} + (t_{su} + t_{sd}) \quad (4)$$

Equations (3) and (4) can be combined into $$b_d \frac{r_1}{r_d - r_1} + (t_{su} + t_{sd})r < b_w < b_d \frac{r_w - r_1}{r_1} - (t_{su} + t_{sd})(r_w - r_1) \quad (5)$$

Or, $$b_w \frac{r_1}{r_w - r_1} + (t_{su} + t_{sd})r < b_d < b_w \frac{r_d - r_1}{r_1} - (t_{su} + t_{sd})(r_d - r_1) \quad (6)$$

Figure 16:
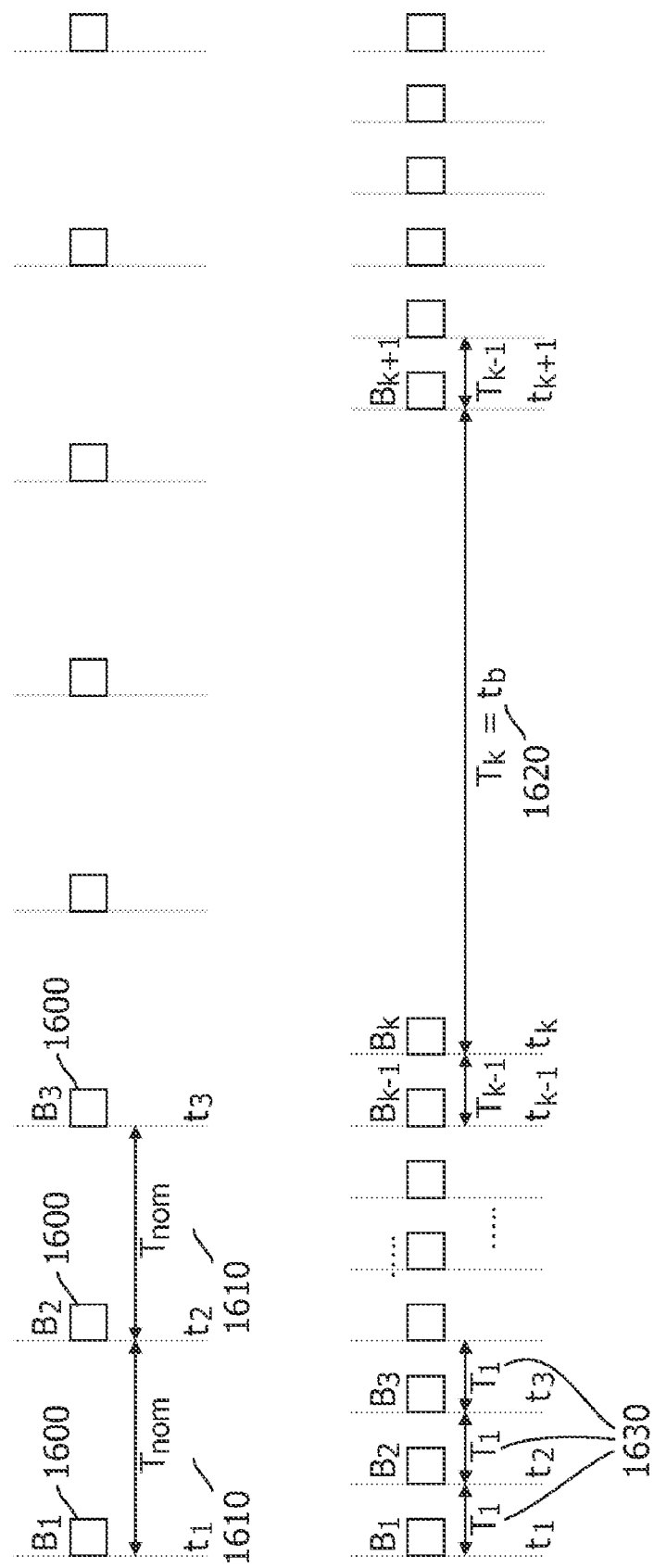
FIG. 16 illustrates the departure of data packets in a smooth (upper) and bursty (lower) manner.

It is also advantageous if the idle time of the WiFi activity can be estimated. The buffer 110 should be able to serve at least a complete burst of WiFi activity, and must be refilled after the burst during idle time. This means determining the end of a burst is relevant for the buffer 110 to function properly. Normally, as shown in FIG. 16, streaming data may be sent over the network 180 in packets of fixed size, $B_i$, 1600, at the stream rate r. This means that packets are transmitted at $T_{nom} = B/r$ time intervals 1610 as shown. In practice, r is not constant meaning that $T_{nom}$ is not constant. Furthermore, $T_{nom}$ will show additional variations due to packet losses and latencies in the network 180. Also shown in FIG. 16, is a bursty transmission of the same stream, where packets are transmitted faster than the stream rate, i.e. at $T_1$ intervals 1630, during a burst, followed by a relatively long idle period 1620.

Figure 17:
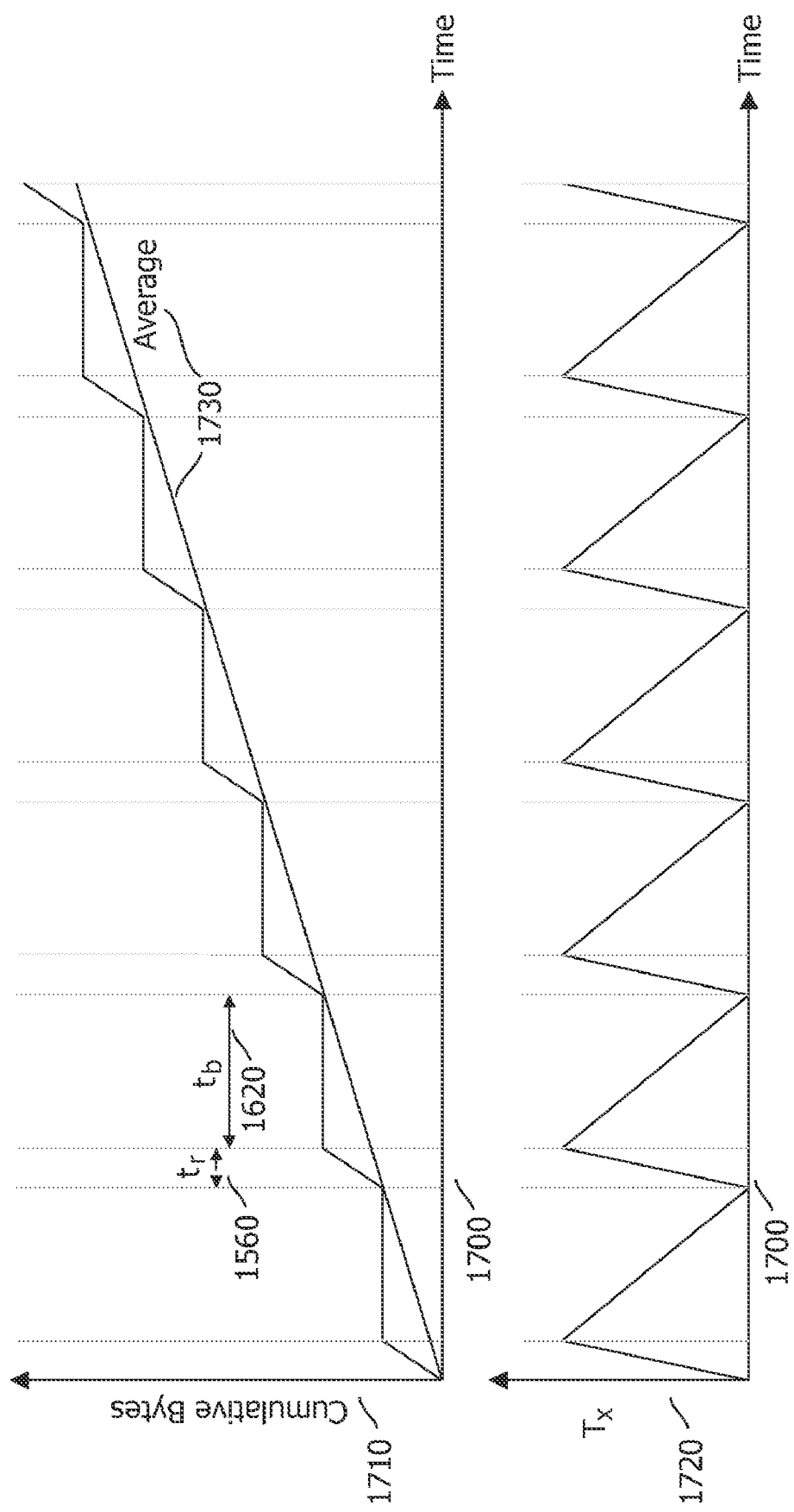
FIG. 17 illustrates the cumulative number of bytes sent (upper) over a wireless interface in the embodiment of FIG. 14 together with the average and the estimated idle time, $T_x$.

The length $t_b$ of the idle period 1620 may be predicted given the stream rate r. As the packets are transmitted faster than the stream rate r during the burst, idle time builds up. The estimated idle time $T_x$ equals $$T_x = \sum_i (T_{nom} - T_i) = \sum_i (B_i/r - T_i) \quad (7)$$

with i=1, 2, 3, . . . , n. The cumulative number of bytes sent over the wireless link corresponding to the stream together with the estimated idle time $T_x$ is shown in FIG. 17. In FIG. 17 the horizontal axes 1700 are time. The vertical axis of the upper trace 1710 is the cumulative number of bytes sent over the wireless link. The average 1730 is also shown. The vertical axis of the lower trace 1720 is the estimated idle time, $T_x$.

The size and time of refill of the buffer 110 may be determined using knowledge of the WiFi activity. The size of the buffer 110 may be equal to the burst size. To determine the burst size, the start and the end of a burst may be detected. This may entail monitoring the departure time of packets and comparing the idle time or the time elapsed since the last departure to a threshold value $T_h$. The threshold $T_h$ may be chosen larger than the typical departure interval $T_m$ and smaller than $T_x$. $T_m$ may be the average departure interval excluding the long idle intervals between the bursts or simply the median of the last m departure intervals, which automatically excludes the extremes. In a typical case, the typical interval between packets may be a few orders of magnitude smaller than the idle interval. Therefore, $T_h$ should not be chosen too close to the typical interval $T_m$. If $T_h > xT_m$, then x should be large enough to cover latencies and other delays in the network 180. This may mean that $$x \cdot T_m < T_h < T_x \quad (8)$$

Whenever the time since the last departure exceeds the threshold, the buffer 110 may be refilled completely even if it is not empty. The maximum size of the buffer 110 may be updated after each burst. The size of the buffer 110 may be chosen slightly larger than the burst size to cover for variations in the bitrate of the stream. Making the buffer 110 larger than necessary has no effect on the behaviour of the system but it does cost memory space. It is noted that the packet as a data entity is just an example; data may enter and leave the buffer 110 as a byte stream. In that case the packets of fixed size, $B_i$, 1600 represent the amount of data that has left the buffer since the last check and may be taken into account in a calculation of $T_x$ as given by equation (7).

Figure 18:
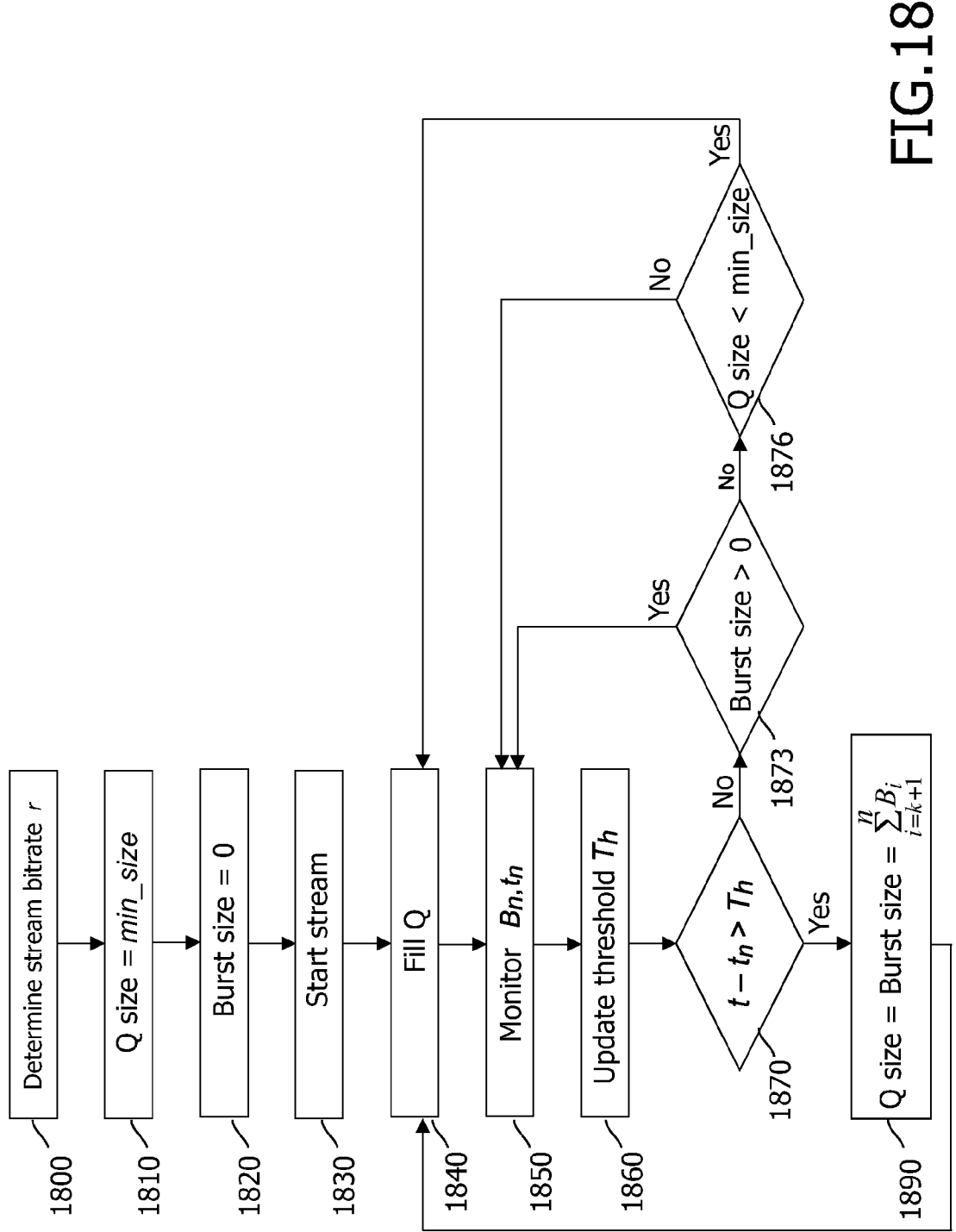
FIG. 18 illustrates a flowchart showing a method for managing the buffer size required in the embodiment of FIG. 14.

A flowchart of an algorithm for managing the buffer 110 is given in FIG. 18. Initially the bitrate of the stream may be determined in step 1800. The stream bitrate may be available as metadata stored on the storage unit 170. Then the buffer 110 may be allocated with minimum size in step 1810. For example, as a single data entity. The burst size may be initialised in step 1820 and the stream then started in step 1830. The buffer 110 may be filled in step 1840. The buffer filling may be checked in step 1850 at fixed intervals to monitor the departure rate of data. Depending on the departure rate the threshold $T_h$ may be updated in step 1860. The time elapsed since the departure of the last data entity n, may be compared to the threshold in step 1870. If it exceeds the threshold then the size of the buffer 110 may be adjusted to the burst size in step 1890 and the buffer 110 may be refilled in step 1840 once more. The burst size equals the total data left the buffer since the end of the last burst (data entity k).

Initially, the buffer 110 may be small (minimum size) and may be filled at the same rate as it gets emptied. It is therefore a small pass through buffer. Once the burst size is determined, the size of the buffer 110 may be adjusted to match the burst size and after that refilled only at the end of a burst as shown in steps 1873 and 1876. The size of the buffer 110 may contain a small margin to accommodate small variations in the burst size.

The buffer 110 and the stream buffer 1430 may be combined into a combined buffer. In addition to the stream buffer threshold 1440 another combined buffer mark at the level of the size of the buffer 110 plus the stream buffer threshold 1440 may be introduced. Whenever the filling of the buffer drops below the combined buffer mark and an end-of-burst is detected, the combined buffer may be refilled completely. The position of the combined buffer mark may be determined in the same way as the size of the buffer 110 taking into account the buffer size of the stream buffer 1430.

In the embodiment of FIG. 14, the second stream 1470 may be received over the wireless interface while serving the first stream 1425. The storage unit 170, the codec 150 and wireless activity on the communication unit 130 may be managed such that concurrent activity does not draw significant power from a power supply. The second stream 1470 may be decoded slightly faster than real-time and buffered in second stream buffer 1410. Decoding may be paused whenever the storage unit 170 spins up, while data is consumed from second stream buffer 1410. However, if a refill is initiated for second stream codec buffer 1400 just before the pause, wireless activity due to this refilling may overlap with storage unit activity. Therefore a refill of second stream codec buffer 1400 may also be paused. Since the decoding is also paused, buffer under-run will not occur. In such a manner even very complicated application scenarios may be supported whilst conserving power.

In summary the invention discloses methods and devices for managing power consumption of a plurality of data processing units. A scheduler schedules a first process step for a first data processing unit consuming a high power within a first deadline and a second process step for a second data processing unit also consuming a high power within a second deadline. The scheduler further schedules the first process step and the second process step such that the two process steps do not occur concurrently thereby reducing the peak power draw from a power supply whilst preserving deadlines. This is particularly beneficial in battery-operated equipment, such as portable electronic multimedia devices, since peak power drain has been found to be an important factor in determining the battery capacity.

It should be noted that the above-mentioned embodiments illustrate rather than limit the invention, and that those skilled in the art will be capable of designing many alternative embodiments without departing from the scope of the invention as defined by the appended claims. Furthermore, any of the embodiments described comprise implicit features, such as, an internal current supply, for example, a battery or an accumulator. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A device (100) for managing power consumption of a plurality of data processing units, the device comprising:
    a first data processing unit (200) having a high first power mode of operation, a low second power mode of operation, and an intermediate power mode of operation between the high first and low second power modes of operation;
    a second data processing unit (240) having a high third power mode of operation, a low fourth power mode of operation, and an intermediate power mode of operation between the high third and low fourth power modes of operation; and
    a scheduler (280) for scheduling, within respective deadlines of operation, either concurrent or non-concurrent operation of the first and second data processing units;
    said scheduler:
        (i) scheduling non-concurrent operation of the first and second data processing units when both of said units are operating in their respective high power modes;
        (ii) scheduling concurrent operation of the first and second data processing units when one of said units is operating in its respective high power mode and the other is operating in its respective intermediate or low power modes; and
        (iii) scheduling concurrent operation of the first and second data processing units when each of said units is operating in either its respective intermediate or low power mode.

2. The device according to claim 1, wherein the scheduler further comprises:
    a first power management unit (500) for setting a desired mode of operation of the first data processing unit;
    a second power management unit (510) for setting a desired mode of operation of the second data processing unit.

3. The device according to claim 2, wherein
    the first power management unit is communicatively coupled (505) to the second power management unit to communicate the desired mode of operation of the first data processing unit to the second power management unit.

4. The device according to claim 2, the device further comprising:
    a clock generation unit (600), and wherein
    the second data processing unit is a processor driven by a clock generated by the clock generation unit; and
    the second power management unit is communicatively coupled (610) to the clock generation unit to control the clock generation unit based upon the desired mode of operation of the second data processing unit.

5. The device according to claim 4, wherein the clock generated by the clock generation unit may be a high frequency such that the second data processing unit operates in the high third power mode of operation or a low frequency such that the second data processing unit operates in the low fourth power mode of operation.

6. The device according to claim 2, the device further comprising:
    a power management unit (1300), and wherein
    the second data processing unit is a processor driven by a clock and a voltage generated by the power management unit; and
    the second power management unit is communicatively coupled (1310) to the power management unit to control the power management unit based upon the desired mode of operation of the second data processing unit.

7. The device according to claim 6, wherein the clock generated by the power management unit may be a high frequency such that the second data processing unit operates in the high third power mode of operation or a low frequency such that the second data processing unit operates in the low fourth power mode of operation.

8. The device according to claim 6, wherein the voltage generated by the power management unit may be a high voltage such that the second data processing unit operates in the high third power mode of operation or a low voltage such that the second data processing unit operates in the low fourth power mode of operation.

9. The device according to claim 1, wherein
the first data processing unit is communicatively coupled to the second data processing unit for passing an output of a first process step as an input to a second process step.

10. The device according to claim 9, the device further comprising:
a buffer (110), the buffer being communicatively coupled to the first data processing unit and the second data processing unit and wherein
the first data processing unit stores the output of the first process step in the buffer and the second data processing unit reads the output of the first process step from the buffer.

11. The device according to claim 1, wherein the first data processing unit or the second data processing unit is one of a selection from:
a processor (120);
a storage unit (170);
a compression unit;
a decompression unit;
a combined compression and decompression unit (150) or a communication unit (130).

12. The device according to claim 2 further comprising a programmable timer (700), the timer being communicatively coupled to the second data processing unit for programming a time period of the timer and for awakening the second data processing unit upon expiration of the time period.

13. The device of claim 1 wherein the low second power mode of operation is a standby mode or a power off mode.

14. The device according to claim 1 further comprising an application management unit (1200) for managing resources for at least one application based upon characteristics of the at least one application, the application management unit being communicatively coupled to the scheduler.

15. A method for managing power consumption of a plurality of data processing units, the method comprising:
determining whether a first data processing unit is operating in a high first power mode, in a low second power mode, or in an intermediate power mode between the high first and low second power modes;
determining whether a second data processing unit is operating in a high third power mode, in a low fourth power mode, or in an intermediate power mode between the high third and low fourth modes;
scheduling by a scheduler, within respective deadlines of operation, either concurrent or non-concurrent operation of the first and second data processing units, said scheduling comprising:
(i) scheduling non-concurrent operation of the first and second data processing units when both of said units are operating in their respective high power modes;
(ii) scheduling concurrent operation of the first and second data processing units when one of said units is operating in its respective high power mode and the other is operating in its respective intermediate or low power modes; and
(iii) scheduling concurrent operation of the first and second data processing units when each of said units is operating in either its respective intermediate or low power mode.

16. The method of claim 15, wherein the method step of scheduling further comprises the method of:
setting a desired mode of operation of the first data processing unit;
setting a desired mode of operation of the second data processing unit.

17. The method of claim 15, further comprising the method step of communicating an output of the first data processing unit as an input to the second data processing unit.

18. The method of claim 17, wherein the method step of communicating further comprises the method step of buffering the output of the first data processing unit prior to communicating the output of the first process step as the input to the second data processing unit.

19. A program element stored in a memory of a programmable device, comprising software code portions for performing, when said program element is run on the device, a method of managing power consumption of a plurality of data processing units, comprising:
determining whether a first data processing unit is operating in a high first power mode, in a low second power mode, or in an intermediate power mode between the high first and low second power modes;
determining whether a second data processing unit is operating in a high third power mode, in a low fourth power mode, or in an intermediate power mode between the high third and low fourth modes;
scheduling, within respective deadlines of operation, either concurrent or non-concurrent operation of the first and second data processing units, said scheduling comprising:
(i) scheduling non-concurrent operation of the first and second data processing units when both of said units are operating in their respective high power modes;
(ii) scheduling concurrent operation of the first and second data processing units when one of said units is operating in its respective high power mode and the other is operating in its respective intermediate or low power modes; and
(iii) scheduling concurrent operation of the first and second data processing units when each of said units is operating in either its respective intermediate or low power mode.

20. A computer program embodied in a non-transitory computer-readable medium for effecting the performance of a method of managing power consumption of a plurality of data processing units, comprising:
determining whether a first data processing unit is operating, in a high first power mode, in a low second power mode, or in an intermediate power mode between the high first and low second power modes;
determining whether a second data processing unit is operating, in a high third power mode, in a low fourth power mode, or in an intermediate power mode between the high third and low fourth modes;
scheduling, within respective deadlines of operation, either concurrent or non-concurrent operation of the first and second data processing units, said scheduling comprising:
(i) scheduling non-concurrent operation of the first and second data processing units when both of said units are operating in their respective high power modes;

(ii) scheduling concurrent operation of the first and second data processing units when one of said units is operating in its respective high power mode and the other is operating in its respective intermediate or low power modes; and (iii) scheduling concurrent operation of the first and second data processing units when each of said units is operating in either its respective intermediate or low power mode.

* * * * *